United States Patent
Luo et al.

(10) Patent No.: US 9,486,864 B2
(45) Date of Patent: *Nov. 8, 2016

(54) PIPE CUTTER

(75) Inventors: Hua Tian Luo, Dongguan (CN); Shui Ming Li, Dongguan (CN); Zhong Qun Liu, Dongguan (CN); Michael Naughton, Oconomowoc, WI (US); John S. Scott, Brookfield, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 1206 days.

This patent is subject to a terminal disclaimer.

(21) Appl. No.: 13/393,131

(22) PCT Filed: Aug. 28, 2009

(86) PCT No.: PCT/US2009/055353
§ 371 (c)(1),
(2), (4) Date: Jan. 3, 2013

(87) PCT Pub. No.: WO2011/025493
PCT Pub. Date: Mar. 3, 2011

(65) Prior Publication Data
US 2013/0097873 A1 Apr. 25, 2013

Related U.S. Application Data

(63) Continuation-in-part of application No. PCT/US2008/069188, filed on Jul. 3, 2008, which is a continuation-in-part of application No. PCT/US2008/069189, filed on Jul. 3, 2008.

(60) Provisional application No. 60/947,706, filed on Jul. 3, 2007.

(51) Int. Cl.
*B23D 21/06* (2006.01)
*B23D 21/00* (2006.01)
(Continued)

(52) U.S. Cl.
CPC .............. *B23D 21/06* (2013.01); *B23D 21/00* (2013.01); *B26B 15/00* (2013.01); *B26D 3/16* (2013.01); *B23D 17/02* (2013.01); *B26D 5/00* (2013.01)

(58) Field of Classification Search
CPC ..... B23D 21/003; B23D 21/04; B23D 21/06
USPC ...... 30/93–102; 83/54, 456, 466, 468.7, 648
See application file for complete search history.

(56) References Cited

U.S. PATENT DOCUMENTS

| 1,762,392 A | 6/1930 | Gray |
| 1,806,555 A | 5/1931 | Gonsett |

(Continued)

FOREIGN PATENT DOCUMENTS

| CA | 1301442 | 5/1992 |
| DE | 3105218 | 9/1982 |

(Continued)

OTHER PUBLICATIONS

PCT/US2008/069188 International Search Report and Written Opinion dated Sep. 30, 2008 (10 pages).
PCT/US08/69209 International Search Report and Written Opinion dated Oct. 7, 2008 (9 pages).
PCT/US2008/069189 International Search Report and Written Opinion dated Oct. 14, 2008 (10 pages).
(Continued)

*Primary Examiner* — Ghassem Alie
*Assistant Examiner* — Evan Macfarlane
(74) *Attorney, Agent, or Firm* — Michael Best & Friedrich LLP

(57) ABSTRACT

A power tool that includes a motor coupled to a drive mechanism, and a removable and rechargeable battery pack coupled to the motor to selectively provide power signals to the motor. The power tool also includes a controller configured to monitor a plurality of conditions of the power tool, such as battery pack voltage, battery pack temperature, operational current, and the like. The controller is also configured to detect one or more events related to the plurality of conditions of the power tool. If the operational current of the power tool exceeds a first threshold value, a power signal duty cycle is reduced from a first duty cycle value to a second duty cycle value to limit the amount of torque the power tool is able to generate.

19 Claims, 21 Drawing Sheets

(51) Int. Cl.
　　B26B 15/00　　　(2006.01)
　　B26D 3/16　　　(2006.01)
　　B23D 17/02　　　(2006.01)
　　B26D 5/00　　　(2006.01)

(56) References Cited

U.S. PATENT DOCUMENTS

| | | | |
|---|---|---|---|
| 2,220,223 | A | 11/1940 | Eerhard et al. |
| 2,716,812 | A | 9/1955 | Noonan |
| 2,731,721 | A | 1/1956 | Traurig |
| 2,927,373 | A | 3/1960 | Taube |
| 3,052,980 | A | 9/1962 | Fieser |
| 3,105,218 | A | 9/1963 | Kozinski |
| 3,178,816 | A | 4/1965 | Schmid |
| 3,453,914 | A | 7/1969 | Lemper et al. |
| 3,524,443 | A | 8/1970 | Batlin |
| 3,693,254 | A | 9/1972 | Salonen |
| 3,942,248 | A | 3/1976 | Sherer et al. |
| 4,283,851 | A | 8/1981 | Wolter |
| 4,368,577 | A * | 1/1983 | Babb ............ B26B 13/26 30/251 |
| 4,434,555 | A | 3/1984 | Stoll |
| 4,549,349 | A | 10/1985 | Harrison |
| 4,608,754 | A | 9/1986 | Kloster |
| 4,747,212 | A | 5/1988 | Cavdek |
| 4,769,911 | A | 9/1988 | Araki |
| 4,802,278 | A | 2/1989 | Vanderpol et al. |
| 4,989,322 | A | 2/1991 | Clayton |
| 5,002,135 | A | 3/1991 | Pellenc |
| 5,018,420 | A | 5/1991 | Plomb |
| 5,058,272 | A | 10/1991 | Steube |
| 5,067,240 | A | 11/1991 | You |
| 5,122,092 | A | 6/1992 | Abdul |
| 5,129,158 | A | 7/1992 | Campagna |
| 5,331,742 | A | 7/1994 | Schmode et al. |
| 5,642,566 | A | 7/1997 | Hirabayashi |
| 5,718,051 | A | 2/1998 | Huang |
| 5,758,729 | A | 6/1998 | Undin |
| 5,775,539 | A | 7/1998 | Bates et al. |
| 5,826,341 | A | 10/1998 | Massa |
| 5,829,142 | A | 11/1998 | Rieser |
| 5,836,079 | A | 11/1998 | Cronin et al. |
| 5,909,830 | A | 6/1999 | Bates et al. |
| 5,987,754 | A | 11/1999 | Hirabayashi et al. |
| 6,044,564 | A | 4/2000 | Jeltsch |
| 6,120,363 | A | 9/2000 | Dunn |
| 6,178,643 | B1 | 1/2001 | Erbrick et al. |
| 6,181,032 | B1 | 1/2001 | Marshall et al. |
| 6,260,447 | B1 | 7/2001 | Hutt |
| 6,370,780 | B1 | 4/2002 | Robertson et al. |
| 6,460,626 | B2 | 10/2002 | Carrier |
| 6,467,172 | B2 | 10/2002 | Jenq |
| 6,513,245 | B1 | 2/2003 | Aubriot |
| 6,553,670 | B2 | 4/2003 | Chang |
| 6,626,792 | B2 | 9/2003 | Vranish |
| 6,637,115 | B2 | 10/2003 | Walsh et al. |
| 6,658,739 | B1 | 12/2003 | Huang |
| 6,935,031 | B1 | 8/2005 | Huang |
| 7,013,567 | B2 | 3/2006 | Myers |
| 7,066,691 | B2 | 6/2006 | Doyle et al. |
| 7,116,071 | B2 | 10/2006 | Glasgow et al. |
| 7,152,325 | B2 * | 12/2006 | Green ............ B23D 21/04 30/101 |
| 7,157,882 | B2 * | 1/2007 | Johnson ............ B25F 5/02 320/134 |
| 7,275,469 | B2 | 10/2007 | Chen |
| 7,293,362 | B2 | 11/2007 | Konen |
| 7,331,109 | B2 | 2/2008 | Tu |
| 7,363,711 | B2 | 4/2008 | Janutin et al. |
| 7,406,769 | B1 | 8/2008 | Toussaint |
| 7,544,146 | B2 | 6/2009 | Vranish |
| 7,578,461 | B2 | 8/2009 | Sederberg et al. |
| 7,601,091 | B2 | 10/2009 | Vranish |
| 7,845,080 | B2 | 12/2010 | Nasiell |
| 8,122,797 | B2 | 2/2012 | Bruurs |
| 8,266,991 | B2 | 9/2012 | Thorson et al. |
| 8,683,704 | B2 * | 4/2014 | Scott et al. .............. 30/228 |
| 8,763,257 | B2 * | 7/2014 | Thorson et al. ............. 30/95 |
| 2001/0042631 | A1 | 11/2001 | Carrier |
| 2004/0055164 | A1 | 3/2004 | Molins |
| 2004/0179829 | A1* | 9/2004 | Phillips ............ H02P 29/02 388/804 |
| 2005/0150113 | A1 | 7/2005 | Shultis |
| 2005/0160606 | A1 | 7/2005 | Yao |
| 2005/0200339 | A1* | 9/2005 | Phillips et al. .............. 323/243 |
| 2005/0274025 | A1 | 12/2005 | Lin |
| 2006/0053633 | A1 | 3/2006 | Gurri Molins |
| 2006/0087286 | A1* | 4/2006 | Phillips ............ B25F 5/00 320/114 |
| 2006/0092674 | A1 | 5/2006 | Belton et al. |
| 2006/0219039 | A1 | 10/2006 | Vranish |
| 2006/0278057 | A1 | 12/2006 | Wuertemberger |
| 2007/0050984 | A1 | 3/2007 | Bartoluzzi |
| 2007/0214648 | A1 | 9/2007 | Lazarevic |
| 2008/0045374 | A1 | 2/2008 | Weinberg et al. |
| 2008/0201961 | A1 | 8/2008 | Wu et al. |
| 2009/0108806 | A1 | 4/2009 | Takano et al. |
| 2009/0199407 | A1 | 8/2009 | Lazarevic |
| 2010/0018059 | A1 | 1/2010 | Huang |
| 2010/0077621 | A1 | 4/2010 | Quigley et al. |
| 2011/0061242 | A1 | 3/2011 | Chen et al. |
| 2013/0000130 | A1 | 1/2013 | Maniwa |
| 2013/0036614 | A1 | 2/2013 | Seigneur |
| 2013/0055574 | A1 | 3/2013 | Nie et al. |
| 2013/0055575 | A1 | 3/2013 | Delmas |
| 2013/0097873 | A1 | 4/2013 | Luo et al. |
| 2014/0182137 | A1* | 7/2014 | Liu et al. ............ 30/92 |

FOREIGN PATENT DOCUMENTS

| | | |
|---|---|---|
| DE | 3524443 | 1/1987 |
| DE | 202004001665 | 6/2004 |
| EP | 1350428 | 10/2003 |
| EP | 1525958 | 4/2005 |
| GB | 2459829 | 9/2008 |
| JP | 55005270 | 1/1980 |
| JP | 10000509 | 1/1998 |
| JP | 2001204251 | 7/2001 |
| WO | 2006/018487 | 2/2006 |
| WO | 2006096172 | 9/2006 |
| WO | 2009/006588 | 1/2009 |
| WO | 2009/006596 | 1/2009 |
| WO | 2009006587 | 1/2009 |

OTHER PUBLICATIONS

PCT/US2009/055353 International Search Report and Written Opinion dated Oct. 20, 2009 (7 pages).
PCT/US2009/055371 International Search Report and Written Opinion dated Oct. 20, 2009 (7 pages).
Tech Briefs, "Phase-Oriented Gear Systems", NASA Tech Briefs, Goddard Space Flight Center, Greenbelt, Maryland, available online at: <http://www.techbriefs.com/component/content/article/2425>, Nov. 1, 2007.
Shelley, Tom, "Armed to the Teeth", Eureka, available online at: <http://www.eurekamagazine.co.uk/article/13038/Armed-to-the-teeth.aspx>, Feb. 9, 2008.
Milwaukee Electric Tool, "Milwaukee Introduces New 12-volt Sub-Compact Driver", News and Media—Press Releases, available online at: <http://www.milwaukeetool.com/NewsAndMedia/PressReleases/Details.aspx? PublicationId=954>, Sep. 20, 2007.
GB1000846.4—Examination Report dated Jul. 8, 2011 (3 pages).
GB1000847.2—Examination Report dated Jul. 8, 2011 (3 pages).
Intellectual Property Office of Great Britain Examination Report for Application No. 1000846.4 dated Nov. 7, 2011, 3 pages.
Intellectual Property Office of Great Britain Examination Report for Application No. 1000847.2 dated Nov. 7, 2011, 4 pages.
Intellectual Property Office of Great Britain Examination Report for Application No. 1000847.2 dated Apr. 9, 2013 (5 pages).

* cited by examiner

PIPE CUTTER

RELATED APPLICATIONS

This application is a continuation-in-part of International Application PCT/US2008/069188, filed Jul. 3, 2008, and International Application PCT/US2008/069189, also filed Jul. 3, 2008, both of which claim priority to U.S. Provisional Patent Application No. 60/947,706, filed Jul. 3, 2007, the entire contents of which are all hereby incorporated by reference.

BACKGROUND

The present invention relates to power tools and, more specifically, to battery-powered pipe cutters.

Manually-operated pipe cutters perform cutting operations in various ways, such as with sawing motions or by successive ratcheting of a pipe cutter knife through a pipe. Oftentimes, these methods of pipe cutting result in imperfect cuts or, when cutting a pipe of a material such as PVC, snapping of the pipe. Manually-operated pipe cutters also cause ergonomic difficulties for the user. In particular, a user having a relatively small hand size or low hand or wrist strength may experience difficulty completing a pipe cut. Additionally, the use of manually-operated pipe cutters can be time consuming.

SUMMARY

Embodiments of the invention provide a power tool that includes a pipe holder, a knife or knife pivotally coupled to the pipe holder, and a drive mechanism coupled to at least one of the pipe holder and the knife. The power tool also includes a motor coupled to a drive mechanism, and a removable and rechargeable battery pack coupled to the motor to selectively power the motor for operating the drive mechanism. The power tool also includes a controller configured to monitor a plurality of conditions of the power tool, such as battery pack voltage, battery pack temperature, operational current, and the like. The controller is also configured to detect one or more events related to the plurality of conditions of the power tool. For example, the controller is configured to monitor the operational current of the power tool. If the operational current of the power tool exceeds a first threshold value, a duty cycle of power signals sent to, for example, the motor, is reduced from a first duty cycle value to a second duty cycle value to limit the amount of torque the power tool is able to generate.

In one embodiment, the invention provides a power tool that includes a pipe holder, a knife pivotally coupled to the pipe holder, and a drive mechanism coupled to at least one of the pipe holder and the knife. The drive mechanism is operable to move at least one of the pipe holder and the knife relative to the other of the pipe holder and the knife. A motor is coupled to the drive mechanism, and a power supply is electrically coupled to the motor. The motor receives a power signal with a duty cycle having a first value. A controller is configured to monitor at least one condition of the power tool and detect at least one event associated with the at least one condition. The power signal duty cycle is modified from the first value to a second value when the controller detects the at least one event associated with the at least one condition of the power tool.

In one embodiment, the invention provides a method for operating a power tool. The method includes selectively providing a power signal having a power signal duty cycle to a motor for driving a drive mechanism, supporting a pipe in a pipe holder, and operating the drive mechanism to move a knife relative to the pipe holder to cut the pipe. The method also includes monitoring at least one condition of the power tool, detecting at least one event associated with the at least one condition of the power tool, and modifying the power signal duty cycle from a first value to a second value when the at least one event associated with the at least one condition of the power tool is detected.

In another embodiment, the invention provides a power tool that includes a housing assembly supporting a motor and a drive mechanism, a pipe holder coupled to the housing assembly and configured to support a pipe, and a knife pivotally coupled to the pipe holder. A battery or battery pack is coupled to the housing assembly, and is electrically coupled to the motor to selectively power the motor to drive the drive mechanism. The drive mechanism is operable to move the knife relative to the pipe holder to cut the pipe that is supported by the pipe holder. The motor receives a motor power signal with a first duty cycle value. A controller is configured to monitor at least one condition of the power tool, and to detect at least one event associated with the at least one condition of the power tool. The first duty cycle value is reduced to a second duty cycle value when the controller detects the at least one event.

In yet another embodiment, the invention provides a pipe cutter that includes a housing assembly, a pipe holder coupled to the housing assembly, and a knife pivotally coupled to the pipe holder. The knife and the pipe holder define a slot for receiving a pipe. A drive mechanism is positioned at least partially within the housing assembly and is coupled to at least one of the pipe holder and the knife. The drive mechanism is operable to move the at least one of the pipe holder and the knife relative to the other of the pipe holder and the knife to cut the pipe positioned within the slot. A motor is positioned at least partially within the housing assembly and is coupled to the drive mechanism. A battery pack is removably coupled to the housing assembly, and is electrically coupled to the motor to selectively power the motor to operate the drive mechanism. A controller is configured to control a power signal, monitor at least one condition of the pipe cutter, and detect at least one event associated with the at least one condition of the pipe cutter. The controller modifies a duty cycle value of the power signal when the controller detects the at least one event.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Embodiments of the invention described herein related to a power tool that includes a pipe holder, a knife pivotally coupled to the pipe holder, and a drive mechanism coupled to at least one of the pipe holder and the knife. The power tool also includes a motor coupled to a drive mechanism, and a removable and rechargeable battery pack coupled to the motor to selectively provide power signals to the motor. A power tool controller is configured to monitor a plurality of conditions of the power tool, such as battery pack voltage, battery pack temperature, operational current, and the like, as well as detect one or more events related to the plurality of conditions of the power tool. For example, the controller is configured to monitor the operational current of the power tool, and if the operational current of the power tool exceeds a first threshold value, a power signal duty cycle is reduced from a first duty cycle value to a second duty cycle value to limit the amount of torque the power tool is able to generate.

Figure 1:
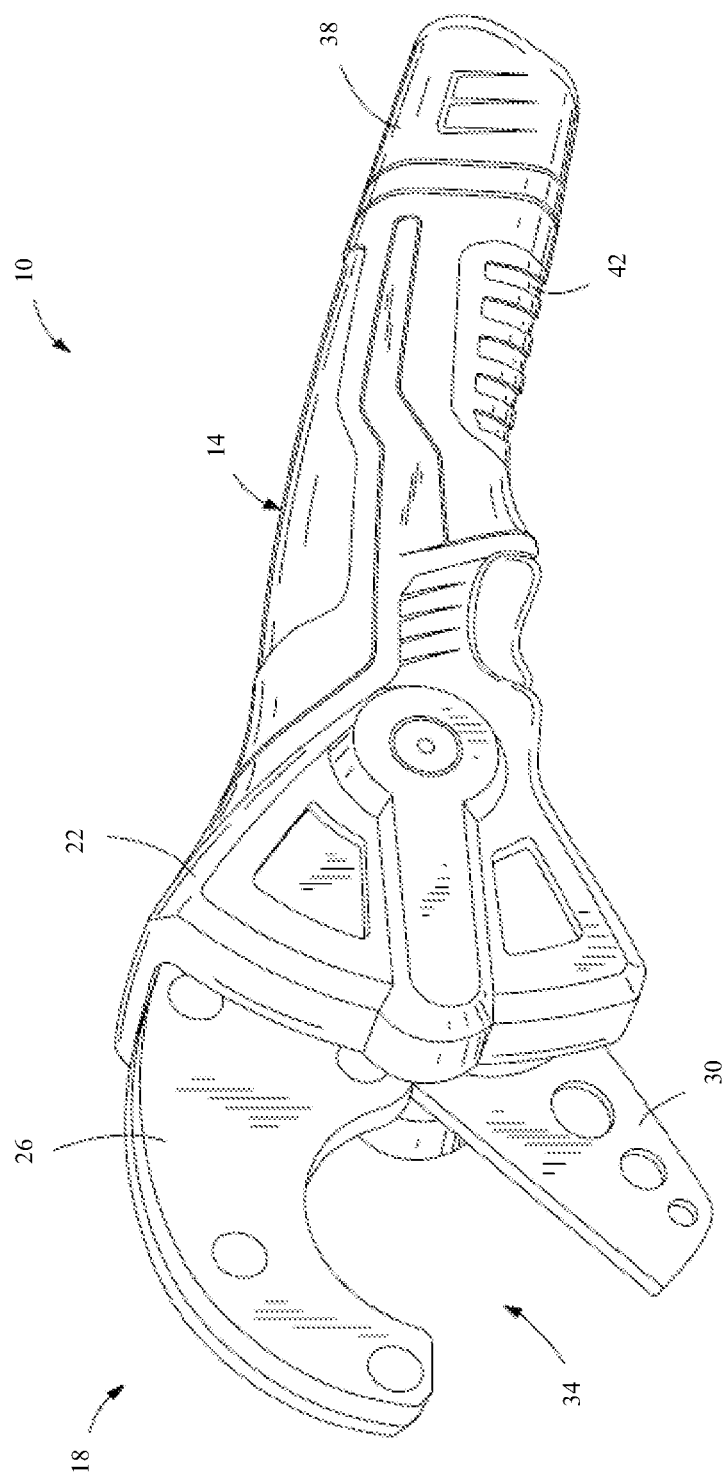
FIG. 1 is a perspective view of a pipe cutter according to an embodiment of the invention.

FIG. 1 illustrates a power tool 10 (also referred to as power tool 110) according to one embodiment of the invention. In the illustrated embodiment, the power tool 10 is a pipe cutter operable to cure a variety of pipes. For example, the illustrated pipe cutter 10 is able to cur a pipe having a ½ in. inner diameter or less. In other embodiments, the pipe cutter 10 is configured to cut a pipe having a diameter greater than ½ in. Additionally, the illustrated pipe cutter 10 is adapted to cut polyvinyl chloride ("PVC") pipe, although a variety of different types of pipes, such as, for example, other types of plastic pipes, metal pipes, or the like, may also be cut with the pipe cutter 10.

Figure 3:
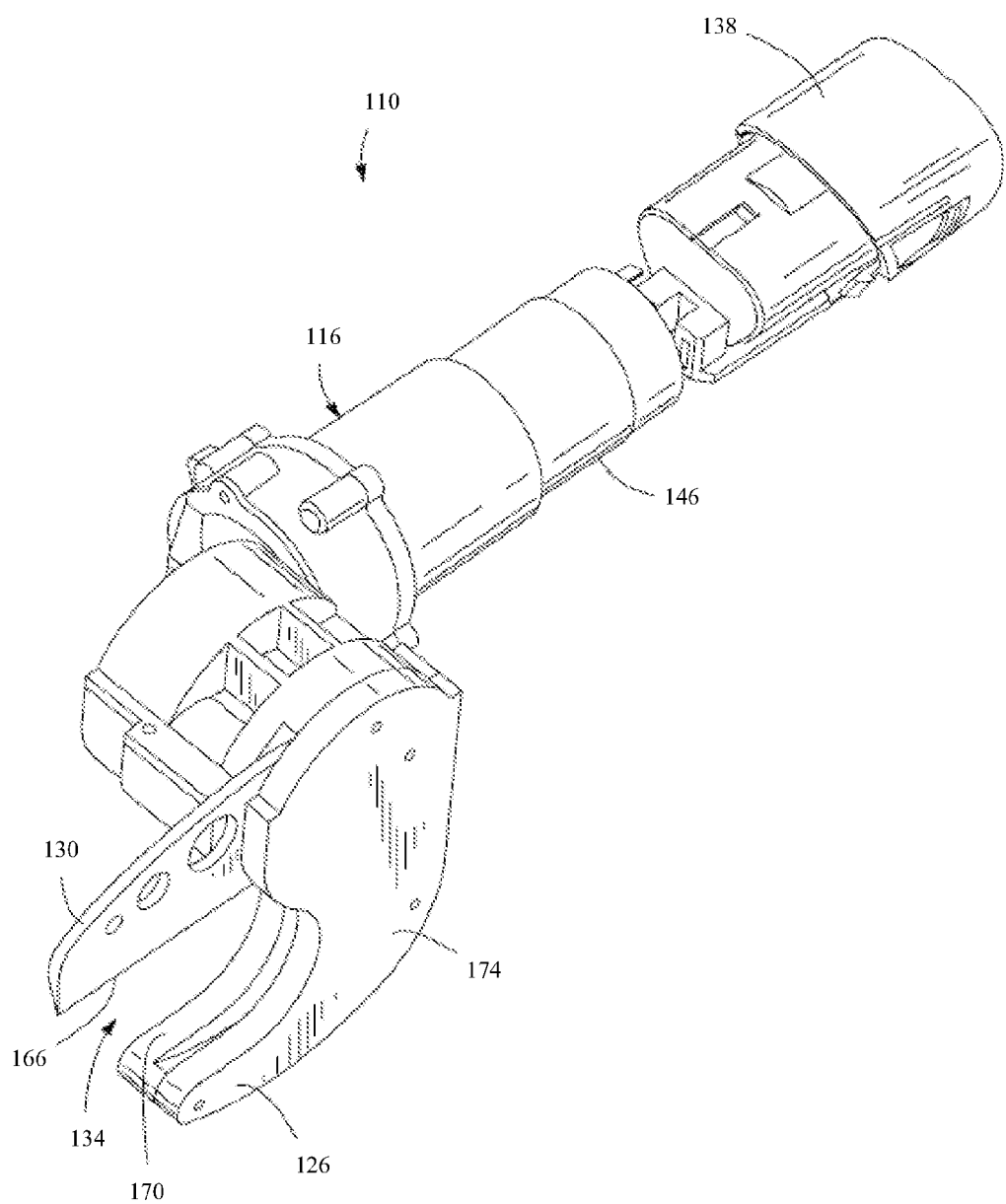
FIG. 3 is a perspective view of a drive mechanism according to an embodiment of the invention.

The pipe cutter 10 includes a housing assembly 14, a motor and a drive mechanism (FIG. 3) positioned within the housing assembly 14, and a cutting mechanism 18 coupled to a forward portion 22 of the housing assembly 14. The cutting mechanism 18 includes a pipe holder 26 and a knife 30 defining a slot 34 therebetween. The slot 34 is configured to receive a pipe to be cut by the cutting mechanism 18. The knife 30 is coupled to the motor through the drive mechanism so that operation of the motor moves the knife 30 toward the pipe holder 26 to cut the pipe. The illustrated pipe cutter 10 also includes a battery pack 38 electrically coupled to the motor such that the pipe cutter 10 is a hand-held, battery-operated power tool. The battery pack is described in greater detail below with respect to FIGS. 7, 8, and 9.

Figure 2:
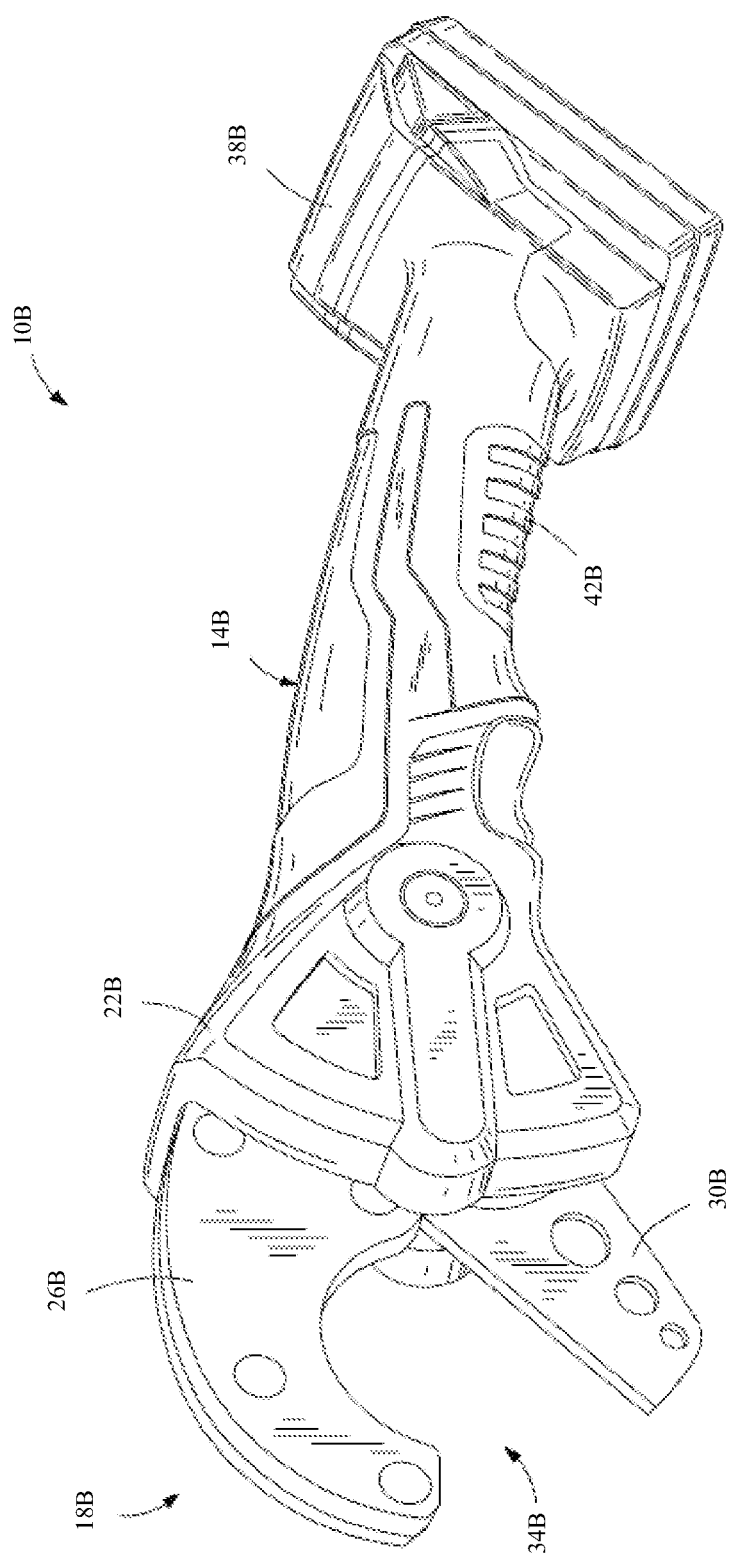
FIG. 2 is a perspective view of a pipe cutter according to another embodiment of the invention.

FIG. 2 illustrates a pipe cutter 10B according to another embodiment of the invention. The illustrated pipe cutter 10B is substantially similar to the pipe cutter 10 shown in FIG. 1, and like parts have been given the same reference numerals plus a "B" annotation. In the illustrated embodiment, the pipe cutter 10B includes an 18-volt power tool battery pack 38B connected to a handle portion 42B of a housing assembly 14B. The battery pack 38B includes five (5) Lithium-ion battery cells and is coupled to the handle portion 42B by sliding. Similar to the battery pack 38 discussed above, the battery pack 38B may alternatively include fewer or more battery cells, the battery cells may have chemistries other than Lithium-ion, and/or the battery pack 38B may be coupled to the handle portion 42B using other coupling means.

In some embodiments, the pipe cutters 10, 10B may include drive mechanisms configured to quickly return the knives 30, 30B of the pipe cutters 10, 10B to an open position. For example, the pipe cutters 10, 10B may include one of the drive mechanisms illustrated and described in International Patent Application Publication No. WO2009/006588, entitled "PIPE CUTTER", filed Jul. 3, 2008, the entire contents of which is hereby incorporated by reference.

In other embodiments, the pipe cutters 10, 10B may include wire cutting mechanisms configured to cut a pipe. For example, the pipe cutters 10, 10B may include one of the wire cutting mechanisms illustrated and described in International Patent Application Publication No. WO2009/006596, entitled "PIPE CUTTER", filed Jul. 3, 2008, the entire contents of which is hereby incorporated by reference.

In some embodiments, the pipe cutters 10, 10B may include a cutting mechanism or knife with an angled blade for cutting a pipe. For example, the pipe cutters 10, 10B may include one of the knives or cutting mechanisms illustrated and described in International Patent Application Publication No. WO2010/009480, entitled "PIPE CUTTER", filed Sep. 1, 2009, the entire content of which is hereby incorporated by reference.

The illustrated pipe cutter 10 includes an internal casing 116 positioned within the forward portion 22 and the handle portion 42 of the housing assembly 14 shown in FIGS. 1 and 2. The internal casing 116 is composed of a hard plastic material, a metal material, and/or any other material or combination of materials suitable for housing the various components of the pipe cutter 110. The casing 116 houses or supports various mechanical and/or electrical components of the pipe cutter 110 which are configured for performing the cutting operation of the pipe cutter 110.

Figure 4:
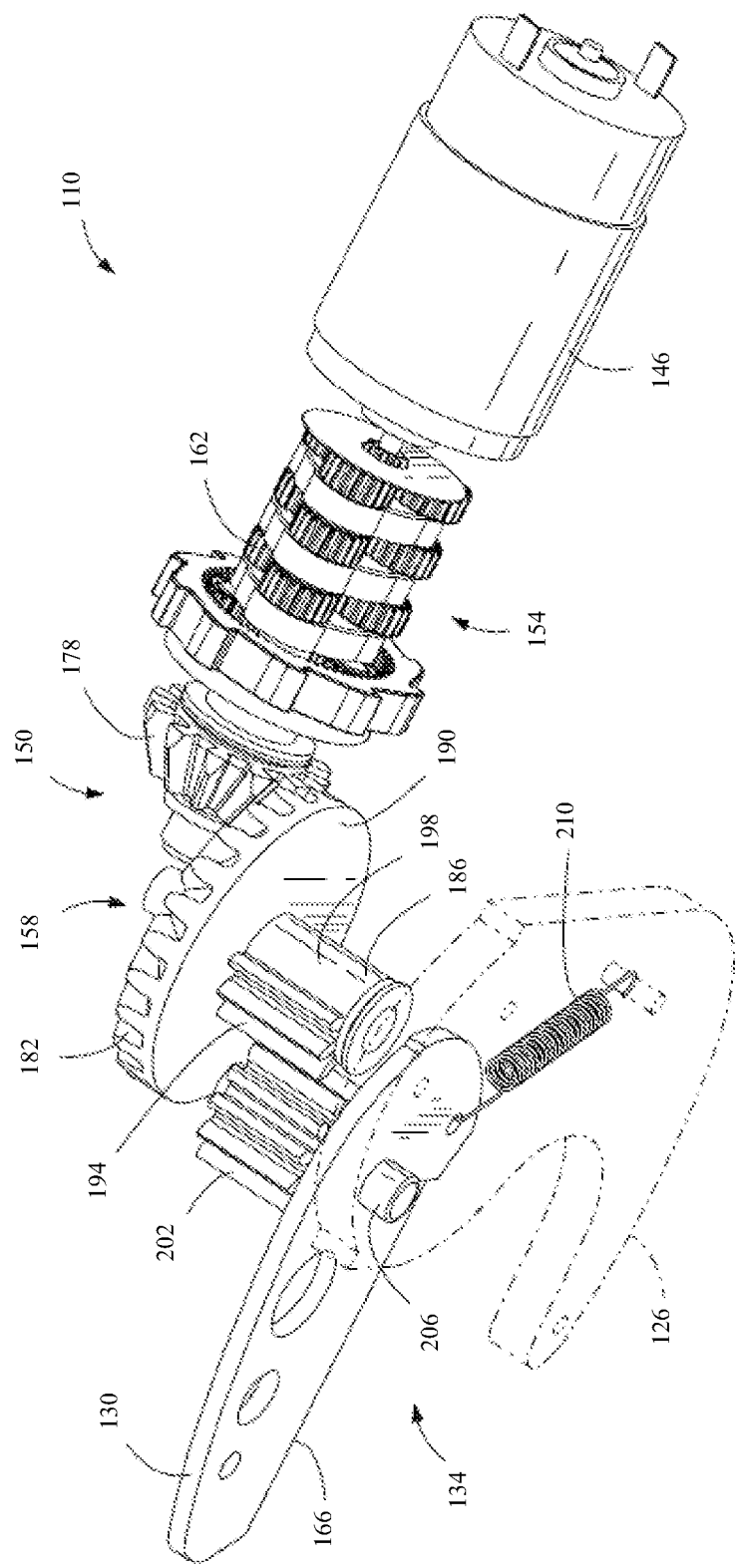
FIG. 4 is a perspective view of a portion of the pipe cutter shown in FIG. 3 with housing portions of the pipe cutter removed to illustrate internal gear mechanisms.

In the illustrated embodiment, the handle portion 42 of the housing assembly supports a battery 138, a motor 146, and a drive mechanism 150 (FIG. 4). The pipe cutter 110 is operable to receive power from the battery 138. In other embodiments, the pipe cutter 110 is powered by alternating current ("AC") power provided through a corded plug electrically coupled to a wall outlet or another suitable power source.

The battery 138, or power supply, is removably coupled to the handle portion for providing power to the motor 146. In the illustrated embodiment, the battery 138 extends from a rearward end of the handle portion when coupled to the pipe cutter 110. The battery 138 is coupled to the pipe cutter 110 via, for example, insertion, sliding, snapping, rotating, or other coupling techniques. In other embodiments, the battery 138 is a dedicated battery contained (e.g., partially or entirely housed) within the pipe cutter 110. When coupled to the handle portion, the battery 138 provides power directly to the motor 146 or may power the motor 146 through a control circuit (not shown). The control circuit controls various aspects of the pipe cutter 110, the motor 146, and/or the battery 138 and may also monitor operation of the pipe cutter 110 and its components.

As shown in FIG. 4, the drive mechanism 150 includes a drive assembly 154 and a cutting gear assembly 158. The drive assembly 154 is supported by the handle portion of the pipe cutter 110 and is powered by the motor 146 to drive the cutting gear assembly 158. In the illustrated embodiment, the drive assembly 154 includes a four-stage planetary gear reduction 162. In other embodiments, the drive assembly 154 may include different gear reductions. In yet another embodiment, the drive assembly 154 may include another type of gear configuration suitable to drive the cutting operation of the pipe cutter 110.

In the illustrated embodiment, the casing 116 supports the cutting gear assembly 158, a knife 130, and a pipe holder 126. The cutting gear assembly 158 is driven by the drive assembly 154 and operates to control cutting motion of the knife 130, which performs the cutting action of the pipe cutter 110. The knife 130 includes a blade 166 having a cutting edge and is pivotally movable relative to the housing assembly 14 (FIGS. 1 and 2), the casing 116, and the pipe holder 126. The knife 130 is formed from a hardened metal material suitable to cut pipes of various materials and of a size sufficient to cut through a desired pipe size. Together, the knife 130 and the pipe holder 126 define a slot 134 for receiving a pipe to be cut. The pipe holder 126, which is stationary relative to the housing assembly 14, is formed with a curved surface 170 facing the blade 166 of the knife 130. The curved surface 170 of the pipe holder 126 provides support for a pipe during the cutting action and helps to align the pipe to be cut. The pipe holder 126 may be integrally formed with the housing assembly 14 or may be separately coupled to the forward portion 22 of the housing assembly 14. The pipe holder 126 is formed from a hard plastic material, a metal material, and/or any other material or combination of materials suitable for supporting a pipe during the cutting activity.

In the illustrated embodiment, the pipe holder 126 includes a cover 174 that forms an exterior portion of the pipe cutter 110 and houses various mechanical and/or electrical components of the pipe cutter 110. The cover 174 may be integrally formed with the housing assembly 14, may be removably coupled to the forward portion 22, or may be permanently coupled to the forward portion 22. The cover 174 may be formed from a hard plastic material, a metal material, and/or any other material or combination of materials suitable for housing the various components of the pipe cutter 110. In the illustrated embodiment, the cover 174 is coupled to the forward portion 22 of the housing assembly 14 and the pipe holder 126. The portion of the cover 174 that is coupled to the holder 126 is formed with a curved surface of the same shape as the curved surface 170 of the pipe holder 126 such that the pipe holder 126 and the cover 174 cooperate to support a pipe during the cutting motion.

Figure 5:
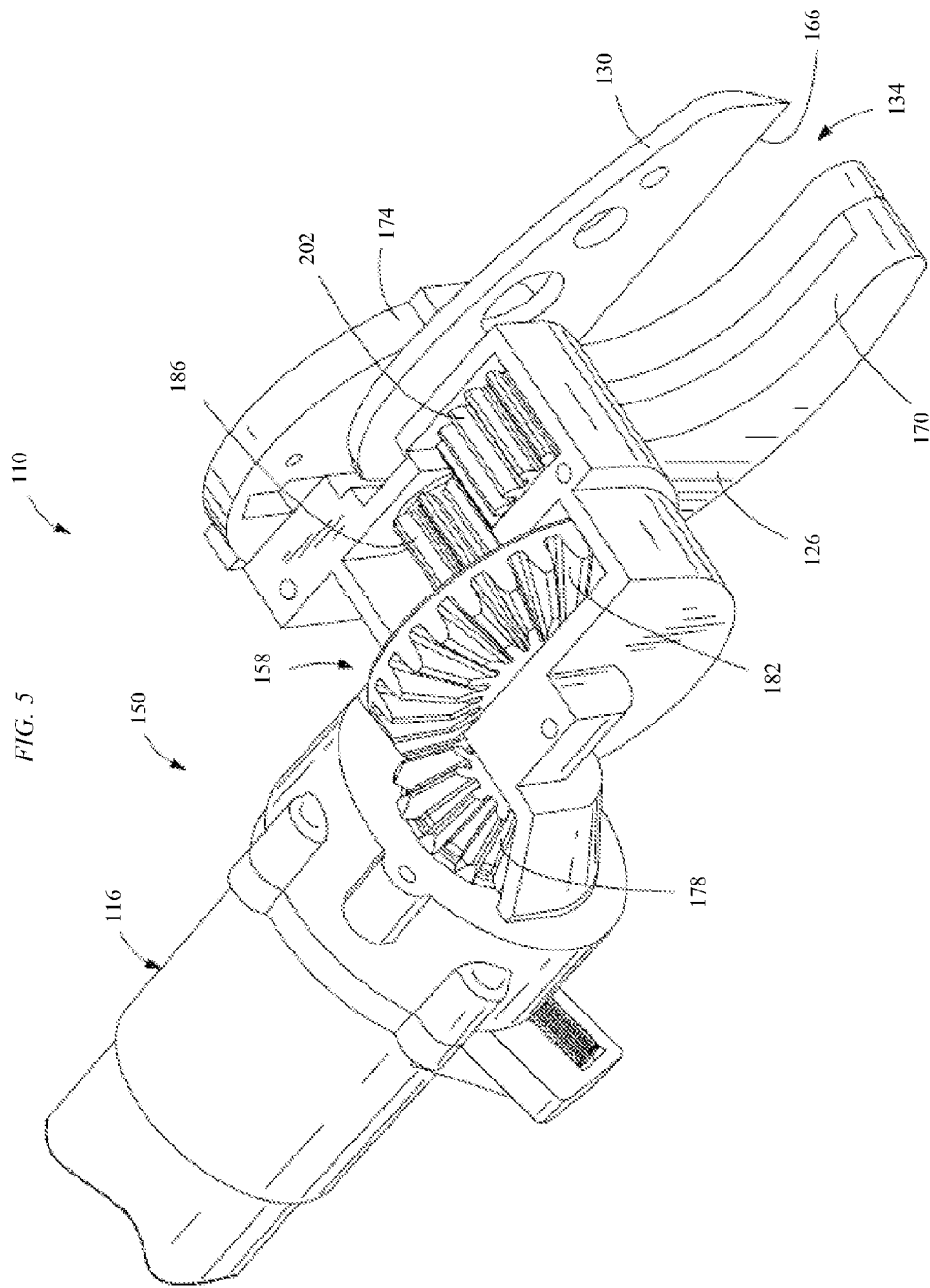
FIG. 5 is a perspective view of a portion of the pipe cutter shown in FIG. 3 with housing portions of the pipe cutter removed to illustrate an internal gear mechanism.
Figure 6:
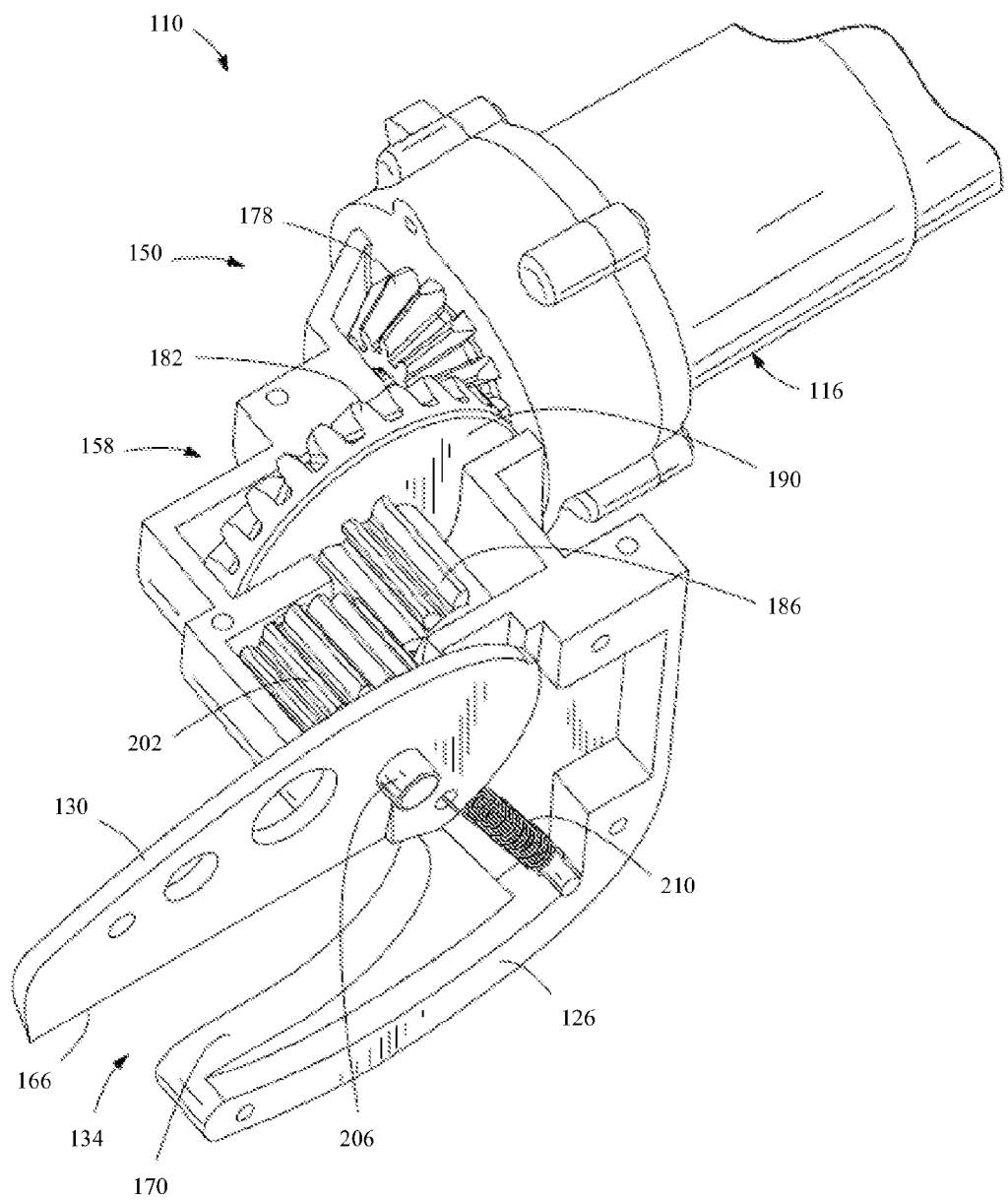
FIG. 6 is another perspective view of the portion of the pipe cutter shown in FIG. 5.

The cutting gear assembly 158 is coupled to and driven by the drive assembly 154 to pivot the knife 130 of the pipe cutter 110. The cutting gear assembly 158 may include various numbers of gears in various configurations. Referring to FIGS. 4-6, the cutting gear assembly 158 includes a first gear 178 driven by the drive assembly 154 and a second gear 182, whereby the first gear 178 engages and drives the second gear 182. In the illustrated embodiment, the first gear 178 and the second gear 182 are bevel gears, although in further embodiments, the first and second gears 178, 182 may be other types of gears.

The second gear 182 includes a spline 186, or spur gear, that extends outward from a rear face 190 of the second gear 182. The spline 186 may be integrally formed with the second gear 182 or may be separately coupled to the second gear 182. The spline 186 includes a toothed portion 194 and a non-toothed portion 198. The spline 186 may include teeth formed on less than half of the circumference of the spline 186. In the illustrated embodiment, the teeth are formed on approximately 90° of the spline 186 circumference, which will result in the knife 130 pivoting 90° during the cutting motion, as discussed below. In embodiments in which the knife 130 pivots less than 90°, the teeth are formed on less than 90° of the spline 186 circumference. Alternatively, in embodiments in which the knife 130 pivots more than 90°, the teeth are formed on more than 90° of the spline circumference.

The cutting gear assembly 158 includes a third gear 202, which is a driven gear that causes the cutting motion of the knife 130. In the illustrated embodiment, the third gear 202 intermeshes with and is driven by the toothed portion 194 of the spline 186; however, the non-toothed portion 198 of the spline 186 does not engage the third gear 202.

Referring to FIGS. 3-6, one end of the knife 130 is rotatably coupled to the third gear 202 at a pivot point defined by a gear shaft 206. The knife 130 is normally biased upward and away from the pipe holder 126 to a first position for receiving a pipe within the slot 134. A spring 210 (FIGS. 4 and 6) extends between the knife 130 and the pipe holder 126 to bias the knife 130 to the first position. In the illustrated embodiment, the spring 210 is an extension spring attached to the internal casing 116 at one end and to the knife 130 at an opposite end. As the third gear 202 rotates, the knife 130 pivots about the pivot point toward the pipe holder 126. The degree that the knife 130 pivots corresponds with the angular distance of the toothed portion 194 of the spline 186. In the illustrated embodiment, the cover 174 encloses an interior area of the pipe holder 126, which contains the spring 210 and the pivot point.

In a further embodiment, the spline 186 is fully toothed (e.g., a full spur gear) and the knife 130 may be returned to the initial position, or the first position, by other means than the spring, such as by reversing the motor 146.

During operation of the pipe cutter 110, a user positions a pipe in the slot 134 such that the pipe rests on the curved surface 170 of pipe holder 126. A user electrically couples the power supply 138 to the motor 146 (e.g., by actuating a switch assembly or circuit) to power the motor 146 and, thereby, drive the drive assembly 154. The drive assembly 154 intermeshes with and drives the first gear 178 of the cutting gear assembly 158, which rotates the second gear 182. As the second gear rotates 182, the spline 186 also rotates. When the toothed portion 194 of the spline 186 engages the third gear 202, the third gear 202 rotates to pivot the knife 130.

As the third gear 202 rotates, the knife 130 pivots toward the pipe holder 126 such that the blade 166 of the knife 130 cuts through a pipe (not shown) positioned in the slot 134. The pivot range of the knife 130 corresponds to the arc length of the toothed portion 194 on the spline 186. In the illustrated embodiment, after the toothed portion 194 of the spline 186 rotates past the third gear 202, the knife 130 will have completed the pipe cut and cutting motion. When the non-toothed portion 198 of the spline 186 is adjacent to the third gear 202, the spline 186 and the third gear 202 do not engage such that the spring 210 biases the knife 130 away from the pipe holder 126 to the first position. The knife 130 is then in position for the next cutting operation.

Figure 7:
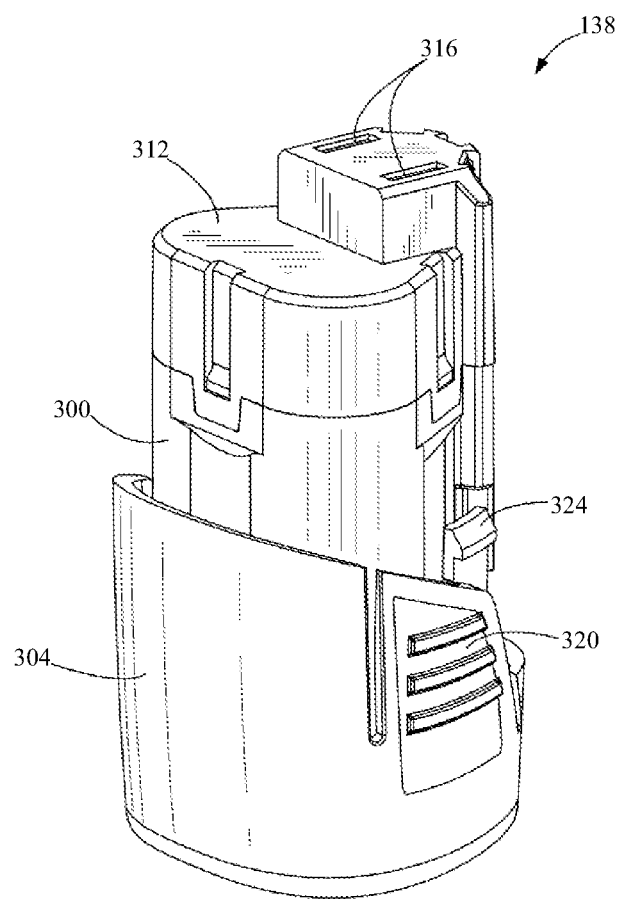
FIG. 7 is a perspective view of a battery pack.
Figure 8:
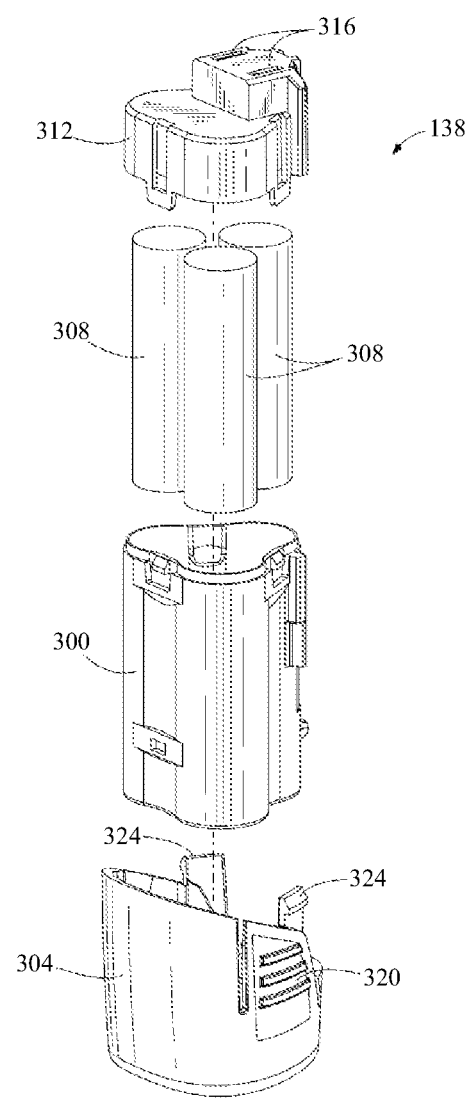
FIG. 8 is an exploded view of the battery pack of FIG. 7.
Figure 9:
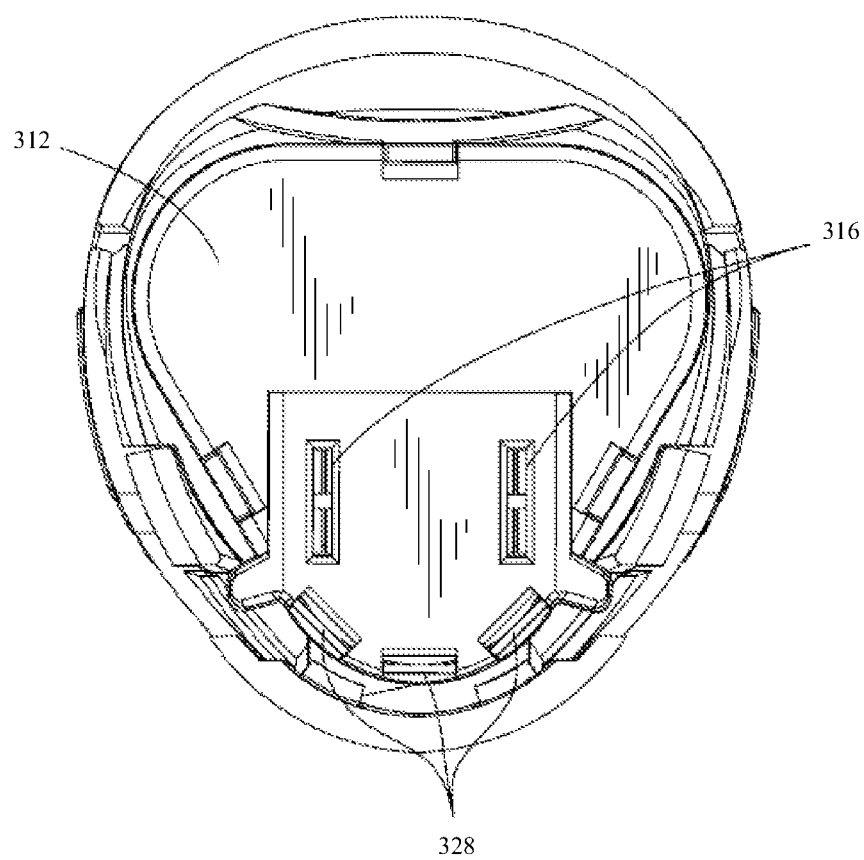
FIG. 9 is a top view of the battery pack of FIG. 7.

FIGS. 7, 8, and 9 illustrate the battery pack 138 for use with the pipe cutter 110. In the illustrated embodiment, the battery pack 138 includes battery cells having a lithium-based chemistry such that the battery pack 138 is over 65% lighter and 50% smaller than an equivalent nickel-cadmium ("NiCd") battery pack. The lithium-ion battery pack 138 also provides a longer operational run-time for the pipe cutter 110, and a longer life (e.g., number of recharge cycles) than other non-lithium based battery packs.

The illustrated battery pack 138 includes a casing 300, an outer housing 304 coupled to the casing 300, and a plurality of battery cells 308 (FIG. 8) positioned within the casing 300. The casing 300 is shaped and sized to fit within a recess of the pipe cutter 110 to connect the battery pack 138 to the pipe cutter 110. The casing 300 includes an end cap 312 to substantially enclose the battery cells 308 within the casing 300. The illustrated end cap 312 includes two power terminals 316 configured to mate with corresponding power terminals of the pipe cutter 110. In other embodiments, the end cap 312 includes terminals that extend from the battery pack 138 and are configured to be received in receptacles supported by the pipe cutter 110. The end cap 312 also includes sense or communication terminals 328 (FIG. 9) that are configured to mate with corresponding terminals of the pipe cutter 110. The terminals 328 couple to a battery circuit (not shown). The battery circuit can be configured to monitor various aspects of the battery pack 138, such as pack temperature, pack and/or cell state of charge, etc. and can also be configured to send and/or receive information and/or commands to and/or from the pipe cutter. In one embodiment, the battery circuit operates as illustrated and described in U.S. Pat. No. 7,157,882 entitled "METHOD AND SYSTEM FOR BATTERY PROTECTION EMPLOYING A SELECTIVELY-ACTUATED SWITCH," issued Jan. 2, 2007, the entire contents of which are hereby incorporated by reference. In another embodiment, the battery circuit operates as illustrated and described in U.S. Patent Publication No. 2006/0091858 entitled "METHOD AND SYSTEM FOR BATTERY PROTECTION," filed May 24, 2005, the entire contents of which are also hereby incorporated by reference.

The casing 300 and power terminals 316 substantially enclose and cover the terminals of the pipe cutter 110 when the pack 138 is positioned in the recess. That is, the battery pack 138 functions as a cover for the recess of the pipe cutter 110. Once the battery pack 138 is disconnected from the pipe cutter 110 and the casing is removed from the recess, the battery terminals of the pipe cutter are generally exposed to the surrounding environment.

The outer housing 304 is coupled to an end of the casing substantially opposite the end cap 312 and surrounds a portion of the casing 300. In the illustrated construction, when the casing 300 is inserted into or positioned within the corresponding recess in the pipe cutter 110, the outer housing 304 generally aligns with an outer surface of the pipe cutter 110. In this construction, the outer housing 304 is designed to substantially follow the contours of the pipe cutter 110 to match the general shape of the housing 14. In such embodiments, the outer housing 304 generally increases (e.g., extends) the length of the handle portion of the pipe cutter 110.

In the illustrated embodiment, two actuators 320 (only one of which is shown) and two tabs 324 are formed in the outer housing 304 of the battery pack 138. The actuators 320 and the tabs 324 define a coupling mechanism for releasably securing the battery pack 138 to the pipe cutter 110. Each tab 324 engages a corresponding recess formed in the pipe cutter 110 to secure the battery pack 138 in place. The tabs 324 are normally biased away from the casing 300 (i.e., away from each other) due to the resiliency of the material forming the outer housing 304. Actuating (e.g., depressing) the actuators 320 moves the tabs 324 toward the casing 300 (i.e., toward each other) and out of engagement with the recesses such that the battery pack 138 may be pulled out of the recess and away from the pipe cutter 110. Such an arrangement allows a user to quickly remove the battery pack 138 from the pipe cutter 110 for recharging or replacement without the use of tools. In other embodiments, the battery pack 138 includes other suitable coupling mechanisms to releasably secure the battery pack 138 to the pipe cutter 110.

As shown in FIG. 8, the battery pack 138 includes three battery cells 308 positioned within the casing 300 and electrically coupled to the terminals 316. The battery cells 308 provide operational power (e.g., DC power) to the pipe cutter 110. In the illustrated embodiment, the battery cells 308 are arranged in series, and each battery cell 308 has a nominal voltage of approximately four-volts ("4V"), such that the battery pack 138 has a nominal voltage of approximately twelve-volts ("12V"). The cells 308 also have a capacity rating of approximately 1.4 Ah. In other embodiments, the battery pack 138 may include more or fewer battery cells 308, and the cells 308 can be arranged in series, parallel, or a serial and parallel combination. For example, the pack 138 can include a total of six battery cells 308 in a parallel arrangement of two sets of three series-connected cells. The series-parallel combination of battery cells 308 creates a battery pack 138 having a nominal voltage of approximately 12V and a capacity rating of approximately 2.8 Ah. In other embodiments, the battery cells 308 may have different nominal voltages, such as, for example, 3.6V, 3.8V, 4.2V, etc., and/or may have different capacity ratings, such as, for example, 1.2 Ah, 1.3 Ah, 2.0 Ah, 2.4 Ah, 2.6 Ah, 3.0 Ah, etc. In other embodiments, the battery pack 138 can have a different nominal voltage, such as, for example, 10.8V, 14.4V, etc. In the illustrated embodiment, the battery cells 308 are lithium-ion battery cells having a chemistry of, for example, lithium-cobalt ("Li—Co"), lithium-manganese ("Li—Mn"), or Li—Mn spinel. In other embodiments, the battery cells 308 may have other suitable lithium or lithium-based chemistries.

Figure 10:
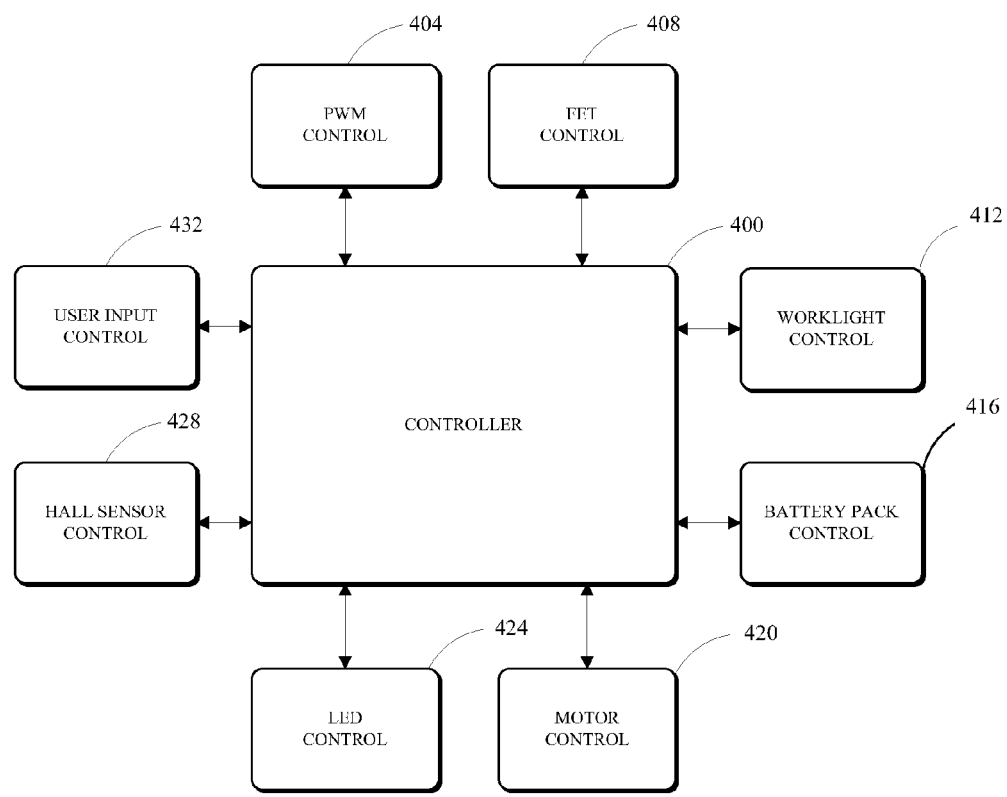
FIG. 10 illustrates a controller for a pipe cutter and a plurality of additional control modules connected to the controller.

The battery pack 138 powers a plurality of components of the pipe cutter 110 including a pipe cutter controller 400 illustrated in FIG. 10. The controller 400 is electrically connected to a plurality of additional control systems or modules within the pipe cutter 110 including a pulse width modulator ("PWM") control module 404, a power field effect transistor ("FET") module 408, a worklight control module 412, a battery pack control module 416, a motor control module 420, an LED control module 424, a Hall sensor control module 428, and a user input control module 432. Although the modules 404-432 are illustrated as being separate from and connected to the controller 400, in some embodiments of the invention, one or more of the control modules 404-432 are integrated into the controller 400. Additionally, other embodiments of the invention include more, fewer, or different control modules coupled to or integrated with the controller 400. The controller 400, the control modules 404-432, or combinations of the controller 400 and control modules 404-432 are used to execute a control process (described below) of the pipe cutter 110. The control process includes, among other things, a variety of measurements, evaluations, and comparisons which are used to determine operating conditions of the pipe cutter 110 and whether the pipe cutter 110 is operating within safe operational parameters.

The pipe cutter controller 400 includes, for example, a printed circuit board ("PCB"). The PCB (not shown) is populated with a plurality of electrical and electronic components which provide operational control and protection to the pipe cutter 110. In some embodiments, the PCB includes a control or processing unit such as a microprocessor, a microcontroller, or the like. In some embodiments, the controller 400 includes the processing unit, a memory, and a bus. The bus connects various components of the controller 400 including the memory to the processing unit. The memory includes, in many instances, read only memory ("ROM") such as an electrically erasable programmable read-only memory ("EEPROM") and random access memory ("RAM"). The controller 400 also includes an input/output system that includes routines for transferring information between components within the controller 400. Software included in the implementation of the pipe cutter 110 is stored in the memory of the controller 400. The software includes, for example, firmware applications and other executable instructions. In other embodiments, the controller 400 can include additional, fewer, or different components.

The PCB also includes, among other things, a plurality of additional passive and active components such as resistors, capacitors, inductors, integrated circuits, and amplifiers. These components are arranged and connected to provide a plurality of electrical functions to the PCB including, among other things, filtering, signal conditioning, and voltage regulation. For descriptive purposes, the PCB and the electrical components populated on the PCB are collectively referred to herein as "the controller" 400. The controller 400 receives signals from the sensors or components within the pipe cutter 110, conditions and processes the signals, and transmits processed and conditioned signals to, for example, the motor, the fuel gauge, etc.

In some embodiments, a battery pack controller (not shown) provides information to the pipe cutter controller 400 through, for example, the battery pack control module 416, related to a battery pack temperature or voltage level. The pipe cutter controller 400 and the battery pack controller also include low voltage monitors and state-of-charge monitors. The monitors are used by the pipe cutter controller 400 or the battery pack controller to determine whether the battery pack 138 is experiencing a low voltage condition, which may prevent proper operation of the pipe cutter 110, or if the battery pack 138 is in a state-of-charge that makes the battery pack 138 susceptible to being damaged. If such a low voltage condition or state-of-charge exists, the pipe cutter 110 is shut down or the battery pack 138 is otherwise prevented from further discharging current to prevent the battery pack 138 from becoming further depleted.

FIGS. 11-17 illustrate a control process 450 for the pipe cutter 110 which is executed by the controller 400. When the pipe cutter 110 is activated or turned on, the controller 400 executes an initialization portion of the control process 450 in which a plurality of operational safety tests is performed. For example, as described in greater detail below, the control process 450 evaluates battery pack voltage, battery pack temperature, power FET temperature, and a Hall sensor signal to determine whether the pipe cutter 110 is functioning properly and is able to be operated without damaging mechanical and/or electrical components within or connected to the pipe cutter 110. Additional tests are performed during normal operation of the pipe cutter 110 to ensure that the pipe cutter 110 is operating within safe operating parameters. These additional tests and operational parameters are described below with respect to the various control sections of the pipe cutter control process 450.

Figure 11:
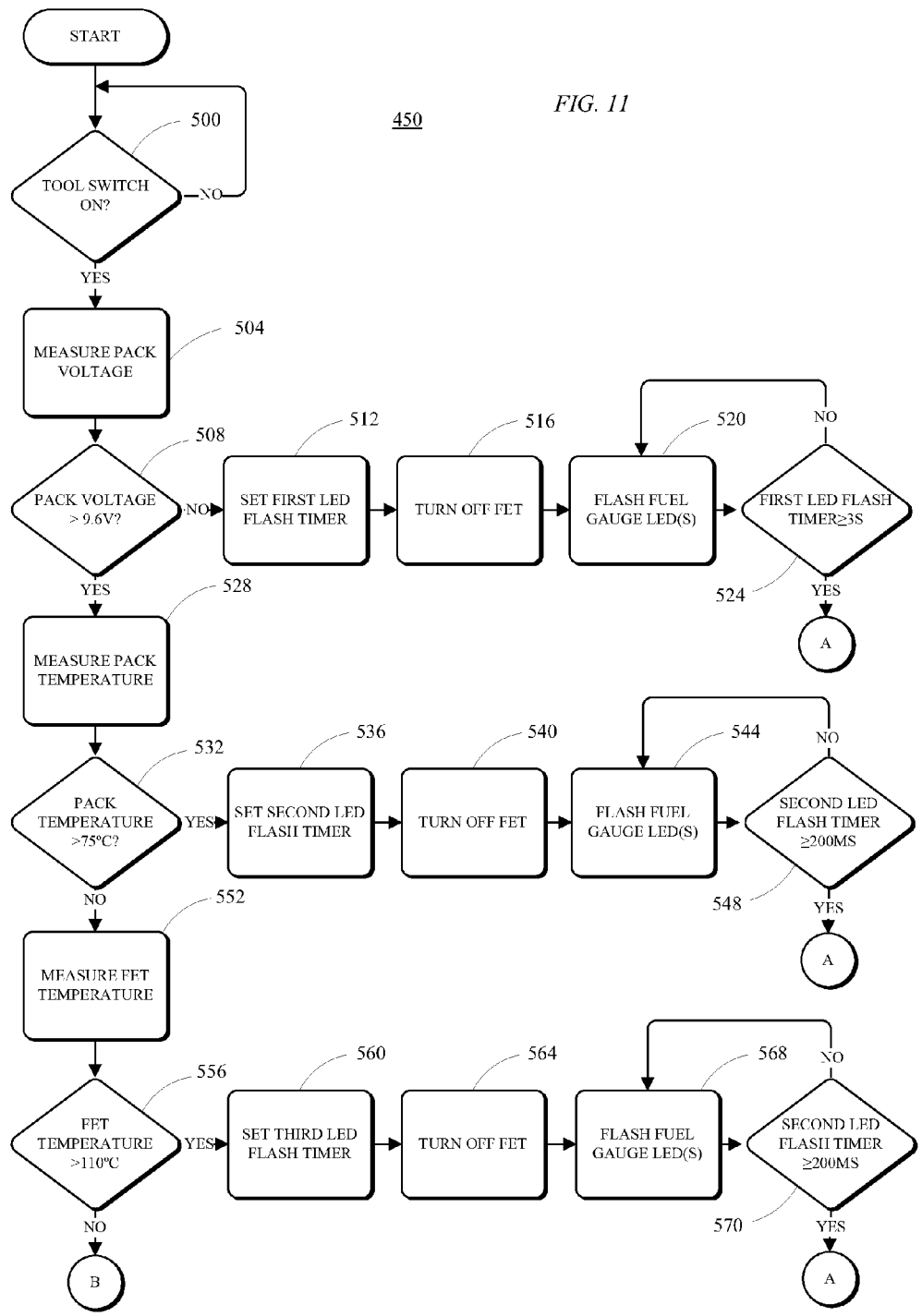
FIGS. 11-17 illustrate a control process executed by the controller shown in FIG. 10 according to an embodiment of the invention.

With reference to FIG. 11, the control process 450 begins when a tool switch is activated (step 500). The tool switch is, for example, a power switch which selectively enables or disables the flow of current from the battery pack 138 to the pipe cutter 110. When the tool switch is in a first position, the pipe cutter 110 is in an 'off state'. When the tool switch is in a second position, the pipe cutter 110 is in an 'on state'. After the tool switch activated and the pipe cutter 110 enters the on state, the controller 400 measures the battery pack voltage (step 504). The battery pack voltage is compared to a first battery pack voltage threshold value (step 508). The first battery pack voltage threshold value varies with the size and chemistry of the battery pack that is powering the pipe cutter 110. The first battery pack voltage threshold value has a value of between, for example, 9.0V and 10.0V, although first battery pack voltage threshold values outside of this range are used in some embodiments of the control process 450.

In the described embodiment, the first threshold voltage level is 9.6V. If the battery pack voltage is not greater than (i.e., less than) the first battery pack voltage threshold value, a first LED flash timer is set (step 512), the power FET is turned off (step 516), and one or more fuel gauge LEDs are flashed (step 520). After the fuel gauge LED flashing is initiated, the first LED flash timer is evaluated (step 524). If the first LED flash timer is less than a first LED flash timer threshold value such as, for example, 3.0 seconds, the fuel gauge LED continues to flash. If the first LED flash timer is greater than or equal to 3.0 seconds, the control process 450 proceeds to control section A shown in and described with respect to FIG. 17.

Returning to step 508, if the battery pack voltage is greater than the first battery pack threshold level, the battery pack temperature is measured (step 528). The measured pack temperature is compared to a first battery pack temperature threshold value (step 532). The first battery pack temperature threshold value is in the range of, for example, 60-90° C. In other embodiments, the first battery pack temperature threshold value is greater than 90° C. or less than 60° C. In the described embodiment, the first battery pack temperature threshold value is 75° C. If the battery pack temperature is greater than the first battery pack temperature threshold value, a second LED flash timer is set (step 536), the power FET is turned off (step 540), and the fuel gauge LEDs are flashed (step 544). After the fuel gauge LEDs begin flashing, the second LED flash timer is evaluated (step 548). If the second LED flash timer is less than a second LED flash timer threshold value such as, for example, 200 ms, the fuel gauge LEDs continue to flash. If the second LED flash timer is greater than or equal to the second LED flash timer threshold value, the control process 450 proceeds to control section A of FIG. 17.

If, at step 532, the temperature of the battery pack is not greater than the first battery pack temperature threshold value, the power FET temperature is measured (step 552). The measured FET temperature is compared to a first power FET temperature threshold value (step 556). The first power FET temperature threshold has a value that is generally greater in magnitude than the first battery pack temperature threshold. For example, the first power FET temperature threshold has a value that is, in many instances, greater than 100° C. In the illustrated embodiment, the first power FET temperature threshold value is 110° C., although this value varies with the size of the battery pack, the type of pipe cutter, the brand of the FET, and the characteristics of other circuitry included in the pipe cutter 110. If the power FET temperature is greater than the first power FET temperature threshold value, a third LED flash timer is set (step 560), the power FET is turned off (step 564), and the fuel gauge LEDs are flashed (step 568). After the fuel gauge LEDs begin flashing, the third LED flash timer is evaluated (step 570). If the third LED flash timer is less than a third LED flash timer threshold value such as, 200 ms in the illustrated embodiment, the fuel gauge LEDs continue to flash. If the third LED flash timer is greater than or equal to the third LED flash timer threshold value, the control process 450 proceeds to control section A of FIG. 17.

Figure 12:
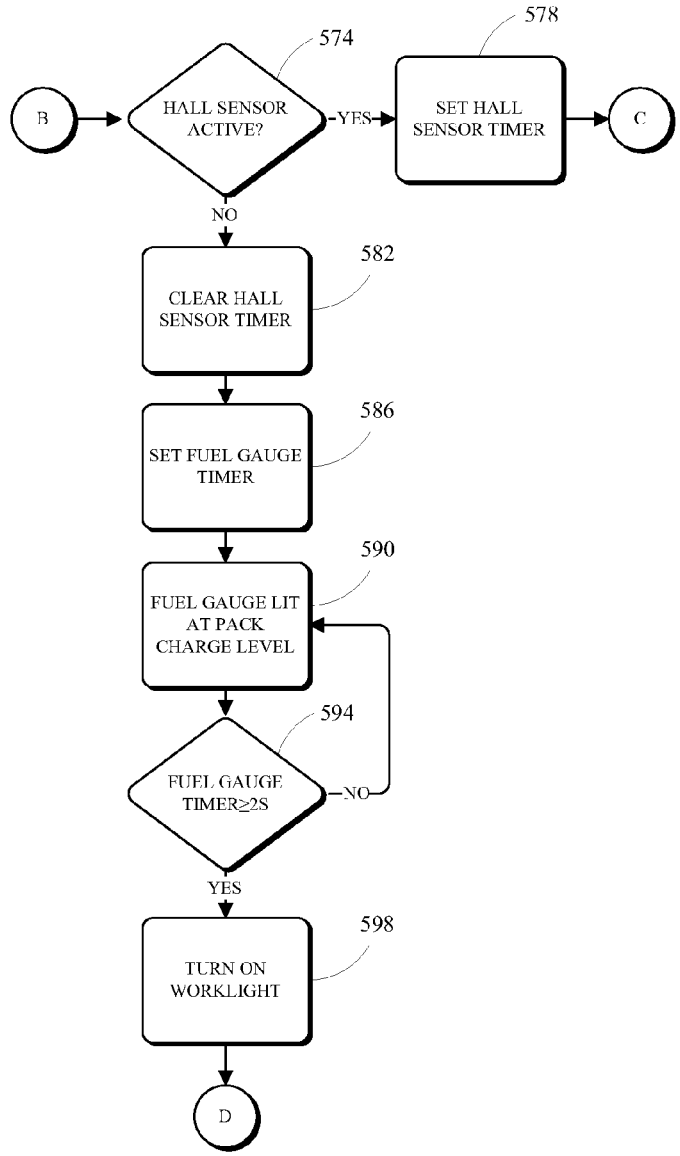

If the power FET temperature is less than the first power FET temperature threshold value at step 556, the control process 450 proceeds to control section B shown in and described with respect to FIG. 12. With reference to FIG. 12, the controller 400 evaluates a Hall sensor signal to determine whether a Hall sensor is active (step 574). If the Hall sensor is active, a Hall sensor timer is set (step 578), and the control process 450 proceeds to control section C shown in and described with respect to FIG. 15. If, at step 574, the Hall sensor is not active, the Hall sensor timer is cleared (e.g., set to a value of 0.0 s) (step 582), and a first fuel gauge timer is set (step 586). The fuel gauge is then lit to a level corresponding to that actual charge level of the battery pack (step 590). For example, in some embodiments, the fuel gauge includes four fuel gauge LEDs. If the actual charge level of the battery pack is 75% or the actual battery pack charge level is within an acceptable tolerance of 75% (e.g., 62.5%<battery pack charge level<87.5%), three of the four fuel gauge LEDs are illuminated.

Following the illumination of the fuel gauge LEDs, the first fuel gauge timer is evaluated (step 594). If the first fuel gauge timer is less than a charge level timer threshold value, such as 2.0 s, the fuel gauge LEDs remains illuminated. If the first fuel gauge timer is greater than or equal to the charge level timer threshold, a worklight (e.g., an LED worklight) (not shown) is turned on or illuminated (step 598), and the control process 450 proceeds to control section D shown in and described with respect to FIG. 13. The worklight is operable to illuminate a work area in front of the pipe cutter 110 or an area around the pipe cutter 110. In some embodiments, the worklight separate from and attachable to the pipe cutter 110. In other embodiments, the worklight is integral to the pipe cutter 110.

Figure 13:
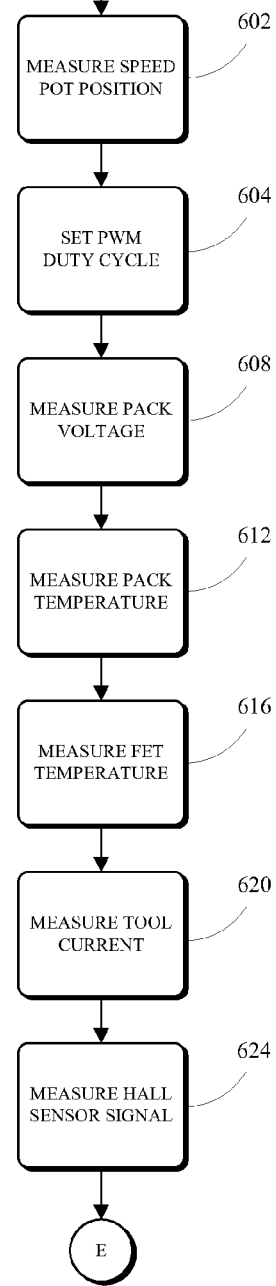

With reference to FIG. 13, following the illumination of the worklight, the pipe cutter 110 enters a normal operational mode. During the normal operational mode, the pipe cutter control process 450 measures a variety of conditions of the pipe cutter 110, such as battery pack voltage, battery pack temperature, power FET temperature, and tool current draw. These measured values are compared to threshold values, which are selected to ensure the pipe cutter 110 is functioning within safe operational parameters. If the pipe cutter 110 is operating outside of the safe operational parameters, the control process 450 includes safeguards and control sections for disabling the pipe cutter 110 until, for example, a battery pack temperature or power FET temperature returns to a normal or acceptable level. The normal operational mode of the pipe cutter 110 with respect to the control process 450 is described below.

Following the illumination of the worklight at step 598, the control process 450 measures the position of a speed potentiometer ("POT") (step 602). The speed POT position or value is measured in a variety of ways. For example, the position of the speed POT is measured as a voltage, and the voltage is used to determine the pipe cutter's speed setting. Alternatively, the resistance of the POT is measured to determine the pipe cutter's speed setting. Using either technique, the pipe cutter's speed setting corresponds to the POT's wiper arm position. The value of the speed POT's position is stored in a memory such as the RAM or EEPROM of the controller 400. Based on the speed POT setting, a PWM duty cycle is set (step 604). For example, at a low speed setting, the pipe cutter requires a lower current level and the duty cycle is correspondingly set to a low value (e.g., 15%). If the speed POT setting is set to a high speed, the pipe cutter requires more current, and the duty cycle is correspondingly set to a higher duty cycle (e.g., 75%). Although the illustrated embodiment of the control process 450 shows the setting of the duty cycle as a discrete step in a detailed process, the duty cycle of the power FET is capable of being continuously adjusted during the operation and use of the pipe cutter 110 based on one or more conditions of the pipe cutter 110, as described below with respect to FIGS. 18-22.

Following step 604, the controller 400 measures the battery pack voltage (step 608), the battery pack temperature (step 612), the power FET temperature (step 616), the tool current (step 620), and the Hall sensor signal (step 624). FIG. 13 illustrates only a portion of one of many embodiments of the control process 450. The values measured in control section D of the control process 450 are, in some embodiments, measured in a different order, measured in parallel, or at different stages in the control process 450. Additionally, other pipe cutter characteristics are also measured in embodiments of the invention, such as torque. Following the measurement of the Hall sensor signal at step 624, the control process 450 proceeds to control section E shown in and described with respect to FIG. 14.

Figure 14:
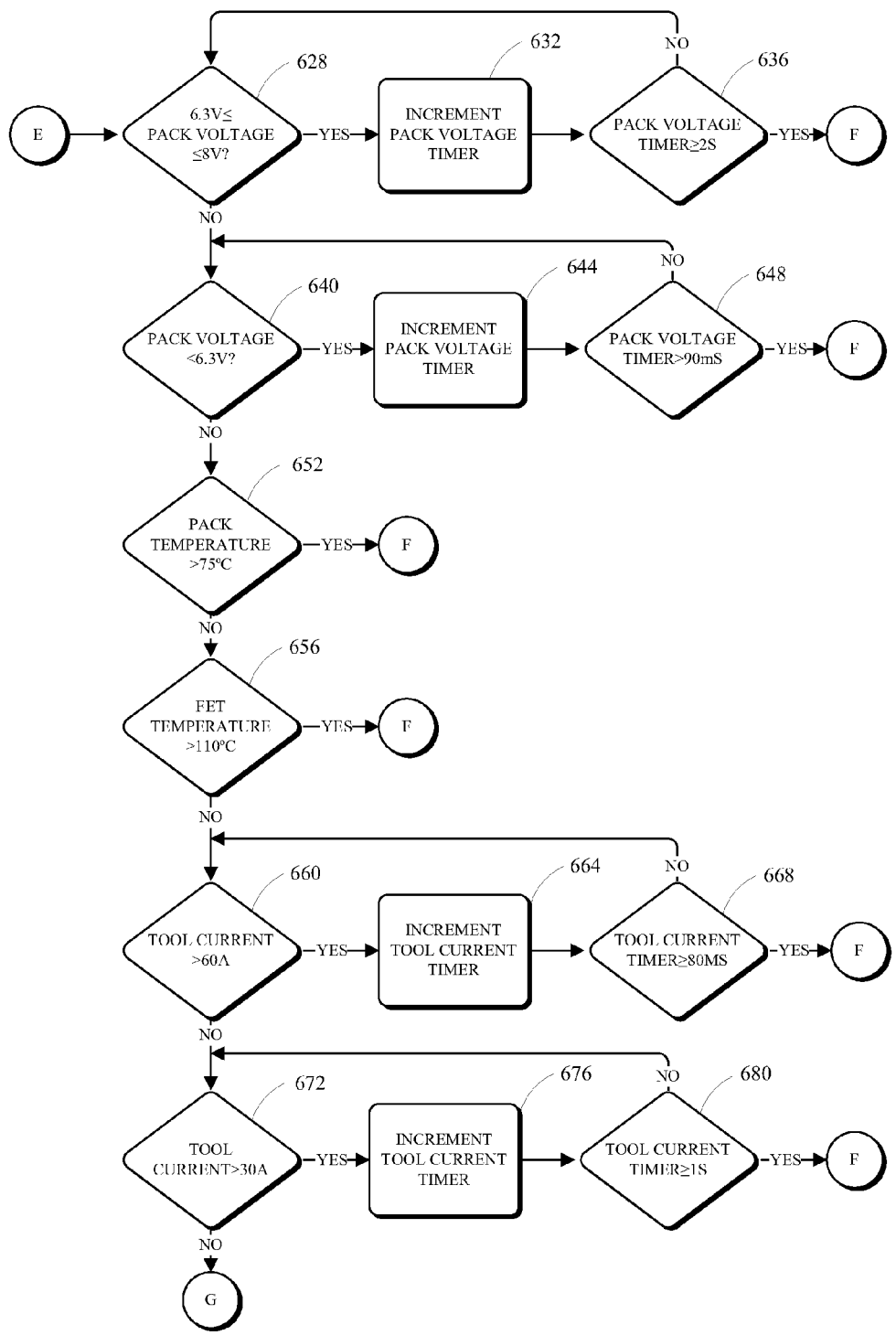

With reference to control section E shown in FIG. 14, the battery pack voltage measured at step 608 is compared to a plurality of voltage ranges to ensure that the battery pack is able to provide the pipe cutter 110 with a sufficient amount of power to operate properly, and that the battery pack is not depleted to a level that would result in damage. For example, at step 628, the measured battery pack voltage is evaluated to determine whether it is greater than or equal to 6.3V and less than or equal to 8.0V. In other embodiments of the invention, different voltages are used for comparison with the measured battery pack voltage. If the battery pack voltage is within the range of step 628, a low battery pack voltage timer is incremented (step 632), and the timer is compared to a first low battery pack voltage timer threshold value (step 636). The first low battery pack timer threshold value is related to the value of the measured battery pack voltage. For example, it is possible, and with respect to some battery-powered tools likely, that fluctuations occur in the measured battery pack voltage. If the battery pack voltage is only temporarily below a safe operating level, the low battery pack voltage timer affords the battery pack a period of time to recover. If the low battery pack voltage timer is greater than or equal to the first low battery pack voltage timer threshold value, the control process 450 proceeds to control section F shown in and described with respect to FIG. 16. If the low battery pack voltage timer is less than the first low battery pack voltage timer threshold value, the measured battery pack voltage is again compared to the voltage range of step 628.

If the measured battery pack voltage is not within the comparison range of step 628, the measured battery pack voltage is compared to, for example, the low side of that comparison range (e.g., 6.3V) (step 640). If the measured battery pack voltage is below 6.3V, a second low battery pack voltage timer is incremented (step 644), and the timer is compared to a second low battery pack voltage timer threshold value, such as 90 ms (step 648). The second low battery pack voltage timer threshold value is less than the first low battery pack voltage timer threshold value because a battery pack voltage of less than approximately 6V is dangerously low and is, if persistent, capable of damaging the battery pack. If the low battery pack voltage timer is greater than or equal to the second low battery pack timer, the control process 450 proceeds to control section F of FIG. 16. If the low battery pack voltage timer is less than the second low battery pack voltage timer threshold value, the measured battery pack voltage is again compared to the voltage range of step 640.

If the measured battery pack voltage is not less than 6.3V at step 640, the measured battery pack temperature is compared to the first battery pack temperature threshold (e.g., 75° C.) (step 652). If the measured battery pack temperature is greater than the first battery pack temperature threshold, the control process 450 proceeds to control section F of FIG. 16. If the measured battery pack voltage is less than the first battery pack temperature threshold, the control process 450 proceeds to step 656 where the measured temperature of the power FET is compared to the first power FET temperature threshold (e.g., 110° C.). If the measured power FET temperature is greater than the first power FET temperature threshold, the control process 450 proceeds to control section F of FIG. 16. If the measured power FET temperature is below the first power FET temperature threshold, the control process 450 evaluates the measured tool current. The measured battery pack temperature and power FET temperature are described with respect to comparisons with the first battery pack temperature threshold and the first power FET temperature threshold, which were used for similar comparisons following the activation of the pipe cutter 110. In some embodiments, different temperature threshold values are used when the pipe cutter 110 is operating in a normal operational mode versus when the pipe cutter 110 has been recently initialized.

Following step 656, the controller 400 compares the measured pipe cutter current to a first current threshold value (step 660). The first current threshold value is, for example, 60 A, or another value which is significantly higher than a normal operating current of the pipe cutter 110 (e.g., 20 A). If the measured pipe cutter current is greater the first current threshold value, a first tool high-current timer is incremented (step 664), and the tool timer is compared to a first tool high-current timer threshold value, such as 80 ms (step 668), although other tool high-current timer threshold values are used in other embodiments of the invention. If the first tool high-current timer is greater than or equal to the first tool high-current threshold value, the control process 450 proceeds to control section F of FIG. 16. If the tool high-current timer is less than the first tool high-current timer threshold value, the pipe cutter current is again compared to the first current threshold value of step 660.

The first tool high-current timer allows the pipe cutter 110 to operate, at least temporarily, at a very high current draw level without the pipe cutter 110 shutting down. For example, as the pipe cutter 110 is cutting through a pipe, a temporary snag or stoppage of the pipe cutter's knife results, in many instances, in a high torque and current draw until the pipe cutter and knife resume normal operation. For a substantially high current, such as the first current threshold value, the pipe cutter 110 and battery pack 138 are only able to operate at such a current level for a short period of time before damage to the pipe cutter 110 or battery pack 138 occur. Although the control process 450 illustrates the pipe cutter current being measured only once and then proceeding through subsequent control steps, the pipe cutter current is, in many instances, measured continuously or at a very high rate. As such the measured pipe cutter current is frequently updated, and it is possible for the measured pipe cutter current to fall below the first current threshold value after an initial comparison resulted in the pipe cutter current being greater than the first current threshold value.

If, at step 660, the pipe cutter current is less than the first current threshold value, the measured pipe cutter current is compared to a second current threshold value (step 672). The second current threshold value is less than the first current threshold value, but elevated from the typically operating current drawn by the pipe cutter 110. In the illustrated embodiment, the second current threshold value is 30 A. If the measured pipe cutter current is greater the second current threshold value, a second tool high-current timer is incremented (step 676), and the tool timer is compared to a second tool high-current timer threshold value, such as 1.0 second (step 680), although other tool high-current timer threshold values are used in other embodiments of the invention. If the second tool high-current timer is greater than or equal to the second tool high-current timer threshold value, the control process 450 proceeds to control section F of FIG. 16. If the tool high-current timer is less than the first tool high-current timer threshold value, the pipe cutter current is again compared to the second current threshold value of step 672. If the measured pipe cutter current is less than the second current threshold value, the control process 450 proceeds to control section G shown in and described with respect to FIG. 15.

In a manner similar to that described above with respect to the first tool high-current timer, the second tool high-current timer allows the pipe cutter 110 to operate, at least temporarily, at a higher than normal current draw level without the pipe cutter 110 shutting down. For a measured pipe cutter current that is only slightly higher than a normal operating current, the pipe cutter 110 and battery pack 138 are able to operate for a longer period of time than for a significantly elevated current draw before damage to the pipe cutter 110 or battery pack 138 are likely to occur. Accordingly, the pipe cutter current has a longer period of time to fall below the second current threshold than it does to fall below the first current threshold. Also, as noted above, although the control process 450 illustrates the pipe cutter current being measured only once and then proceeding through subsequent control steps, the pipe cutter current is, in many instances, measured continuously or at a very high rate. As such the measured pipe cutter current is frequently updated, and it is possible for the measured pipe cutter current to fall below the second current threshold value after an initial comparison resulted in the pipe cutter current being greater than the second current threshold value.

With reference to control section G (FIG. 15) of the control process 450, step 684 of the control process 450 evaluates the Hall sensor timer to determine whether it has been set (e.g., whether the timer is incrementing or counting). Step 684 follows both steps 578 (after initialization of the tool) and 672 (during normal operation of the tool) described above. If the Hall sensor timer is not set (typically following step 672), the controller 400 determines whether the Hall sensor is active (step 688). If the Hall sensor is not active, the control process 450 proceeds to control section D shown in and described above with respect to FIG. 13. As previously noted, control section D is representative of the beginning of the normal operational mode for the pipe cutter 110. As long as the pipe cutter 110 is operational (i.e., the tool switch is activated), and the operational parameters described above (e.g., battery pack voltage, battery pack temperature, power FET temperature, tool current, etc.) remain within acceptable limits, the pipe cutter 110 continues to cycle through the normal operational mode sections of the control process 450.

If, at step 688, the Hall sensor is active, the power FET is turned off immediately (step 692), the worklight is turned off (step 696), and one fuel gauge LED is activated (step 700). Following step 700, the controller 400 monitors the tool switch for deactivation (i.e., turning off the pipe cutter 110) (step 704). The controller 400 continues to monitor for the deactivation of the tool switch. Until the tool switch is turned off, the power FET is held off (step 708). After the tool switch is turned off, the control process 450 proceeds to control section H shown in and described with respect to FIG. 17.

With reference once again to step 684, if the Hall sensor timer is set (typically following step 578 of initialization), the Hall sensor timer is compared to a Hall sensor timer threshold value (step 712). The Hall sensor timer threshold value is generally within the range of 1.0 second to 8.0 seconds, although the Hall sensor timer value is outside of this range in some embodiments of the invention. In the illustrated embodiment, the Hall sensor timer threshold value is 5.0 seconds. If the Hall sensor timer is less than the Hall sensor timer threshold value, the controller 400 evaluates the Hall sensor to determine whether it is active (step 716). If the Hall sensor is not active, or is no longer active, the control process 450 proceeds to control section D described above with respect to FIG. 13 and the normal operation of the pipe cutter 110. If the Hall sensor is active, the Hall sensor timer is incremented (step 720), and the Hall sensor timer is again compared to the Hall sensor timer threshold value at step 712. When the Hall sensor timer is greater than or equal to the Hall sensor timer threshold value during the comparison of step 712, the power FET is turned off immediately (step 692), the worklight is turned off (step 696), and one fuel gauge LED is activated (step 700). Following step 700, the controller 400 monitors the tool switch for deactivation (step 704). The controller 400 continues to monitor for the deactivation of the tool switch and holds the power FET off (step 708) until the tool switch is deactivated. After the tool switch is deactivated, the control process 450 proceeds to control section H of FIG. 17.

Figure 16:
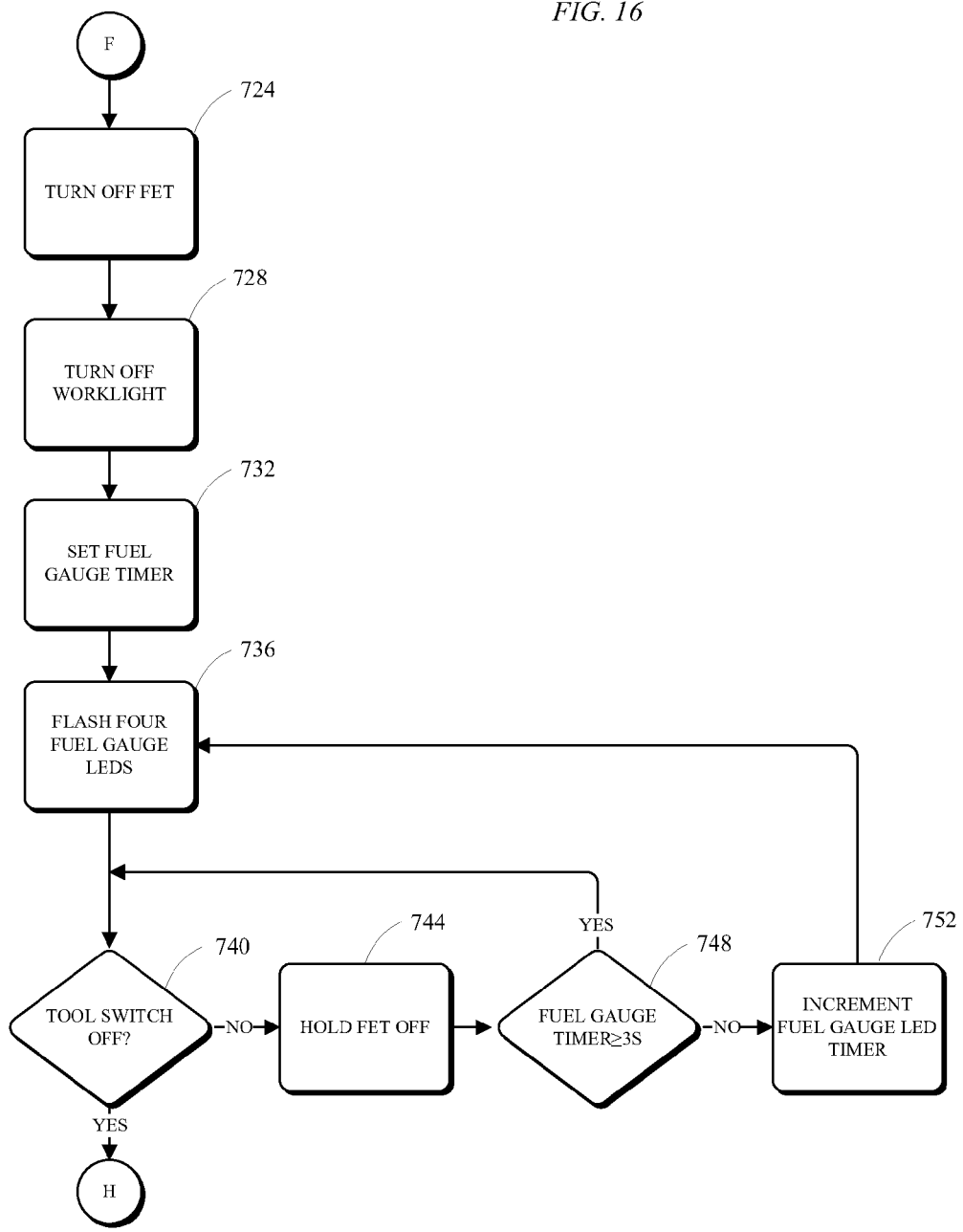

Reference is now made to FIG. 16 and control section F. Control section F follows a variety of steps, such as steps 636, 648, 652, 656, 668, and 680, each of which follows the detection of a fault condition (e.g., under-voltage, high temperature, excessive current, etc.). When at least one of the above described fault conditions occurs, the pipe cutter 110 is disabled to prevent damage to the pipe cutter 110, damage to the battery pack 138, or injury to a user. Accordingly, the power FET is turned off (step 724) and the worklight is turned off (step 728). After the worklight is turned off, a second fuel gauge timer is set (step 732) and all four fuel gauge LEDs are flashed (step 736) at a predetermined interval (e.g., 0.5 Hz or 1.0 Hz). Following step 736, the controller 400 monitors the tool switch for deactivation (i.e., turning off the pipe cutter 110) (step 740). The controller 400 continues to monitor for the deactivation of the tool switch. Until the tool switch is turned off, the power FET is held off (step 744). The second fuel gauge timer is compared to a fuel gauge LED timer threshold value, such as 3.0 seconds (step 748). If the second fuel gauge timer is less than the fuel gauge LED timer threshold value, the second fuel gauge LED timer is incremented (step 752) and the fuel gauge LEDs continue to flash. The controller 400 continues to check for the deactivation of the tool switch (step 740), the power FET continues to be held off (step 744), and the second fuel gauge timer continues to be compared to the fuel gauge LED timer threshold value (step 748). If the fuel gauge timer is greater than or equal to the fuel gauge LED timer threshold value, the controller 400 continues to monitor for the deactivation of the tool switch, but the fuel gauge LEDs are no longer flashed. When the tool switch is deactivated, the control process 450 proceeds to control section H of FIG. 17.

Figure 15:
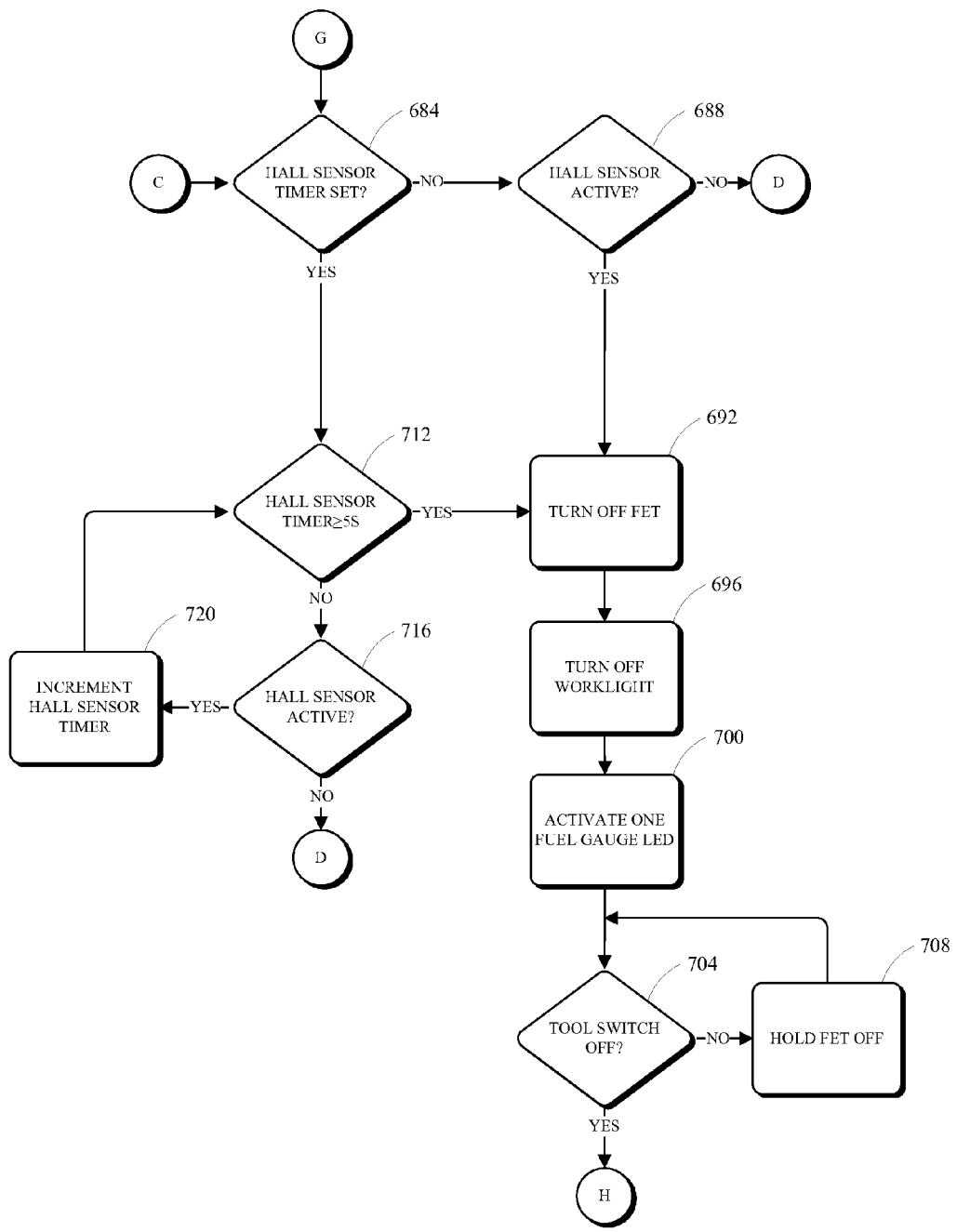
Figure 17:
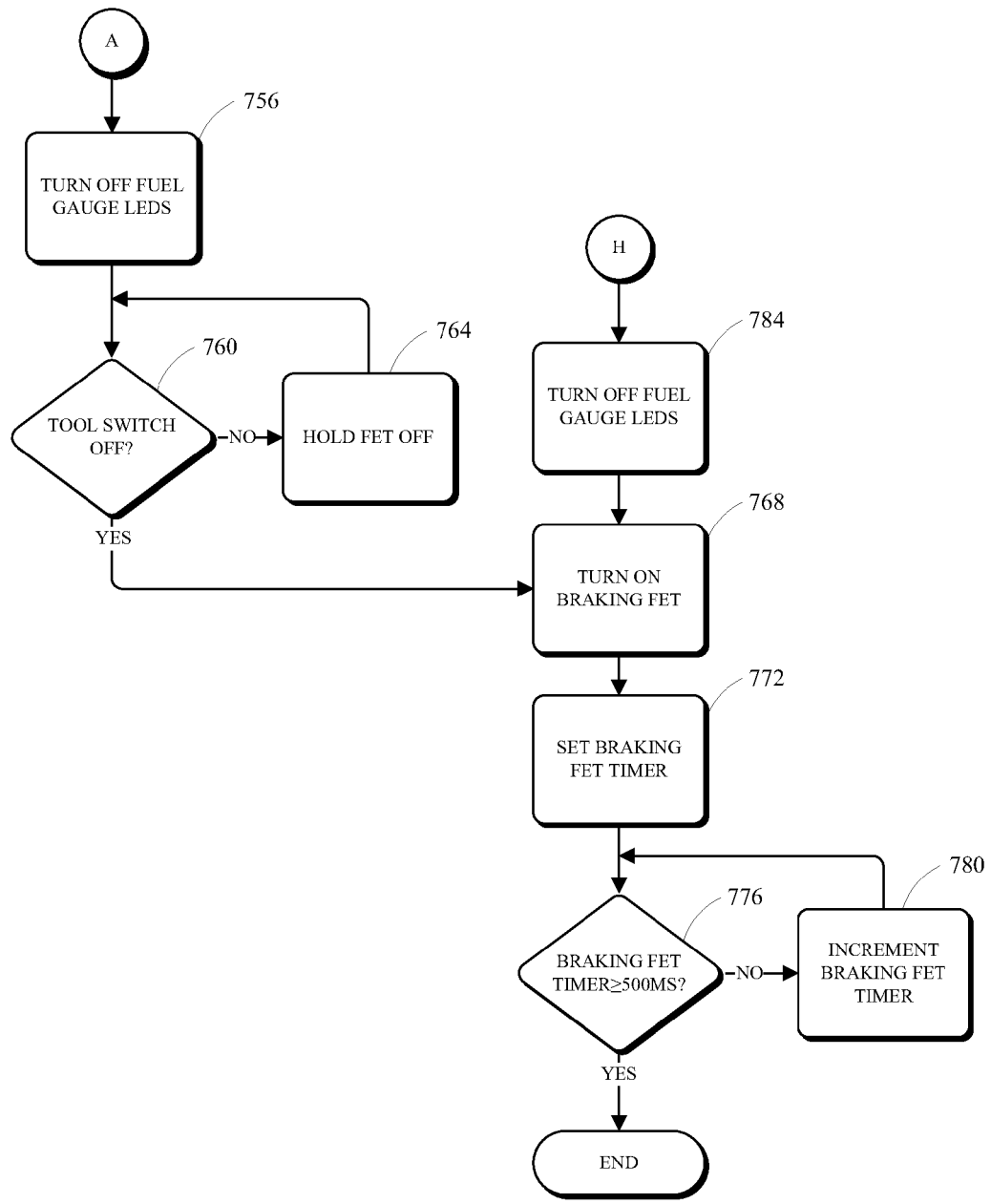

With reference to FIG. 17, control section A, which follows control process steps 524, 548, and 570 shown in FIG. 11, and control section H, which follows control process step 704 shown in FIG. 15 and control process step 740 shown in FIG. 16, are described. Control section A follows the detection of a fault condition during the initialization of the pipe cutter 110. For example, after the tool switch is activated, the battery pack voltage, battery pack temperature, and power FET temperature are measured and evaluated. If one or more of these values are outside of predetermined operational ranges or exceed predetermined threshold values, the pipe cutter 110 is disabled to prevent damage to the pipe cutter 110 or the battery pack 138. As previously described with respect to FIG. 11, after the detection of each fault condition, the power FET is turned off and a visual indication is provided to a user in the form of illuminated or flashing fuel gauge LEDs. After the fuel gauge LEDs have been illuminated or flashed for a predetermined period of time, the fuel gauge LEDs are turned off (step 756). Following step 756, the controller 400 monitors the tool switch for deactivation (i.e., turning off the pipe cutter) (step 760). The controller 400 continues to monitor for the deactivation of the tool switch, and the power FET is held off (step 764) until the tool switch is deactivated. After the controller 400 detects that the tool switch has been deactivated, a braking FET is turned on (step 768), and a braking FET timer is set (step 772). The braking FET is used to slow down or stop the motor that is producing the pipe cutter's cutting motion. The braking FET timer is compared to a braking FET timer threshold value, such as 500 ms (step 776). The braking FET timer is selected based on characteristics of the pipe cutter 110 such as, for example, the size of the motor, the size of the battery pack, and the torque produced at the cutting knife. If the braking FET timer is less than the braking FET timer threshold value, the braking FET timer is incremented (step 780), and the braking FET timer is again compared to the braking FET timer threshold value (step 776). If the braking FET timer is greater than or equal to the braking FET timer threshold value, the control process 450 ends.

With continued reference to FIG. 17, and reference now to control section H of the control process 450, following steps 704 and 740 in which the tool switch was turned off after the detection of a fault condition, any fuel gauge LEDs that were illuminated or flashing are turned off (step 784), a braking FET is turned on (step 768), and a braking FET timer is set (step 772). The braking FET timer is compared to the braking FET timer threshold value (e.g., 500 ms) (step 776). If the braking FET timer is less than the braking FET timer threshold value, the braking FET timer is incremented (step 780), and the braking FET timer is again compared to the braking FET timer threshold value (step 776). If the braking FET timer is greater than or equal to the braking FET timer threshold value, the control process 450 ends.

Figure 18:
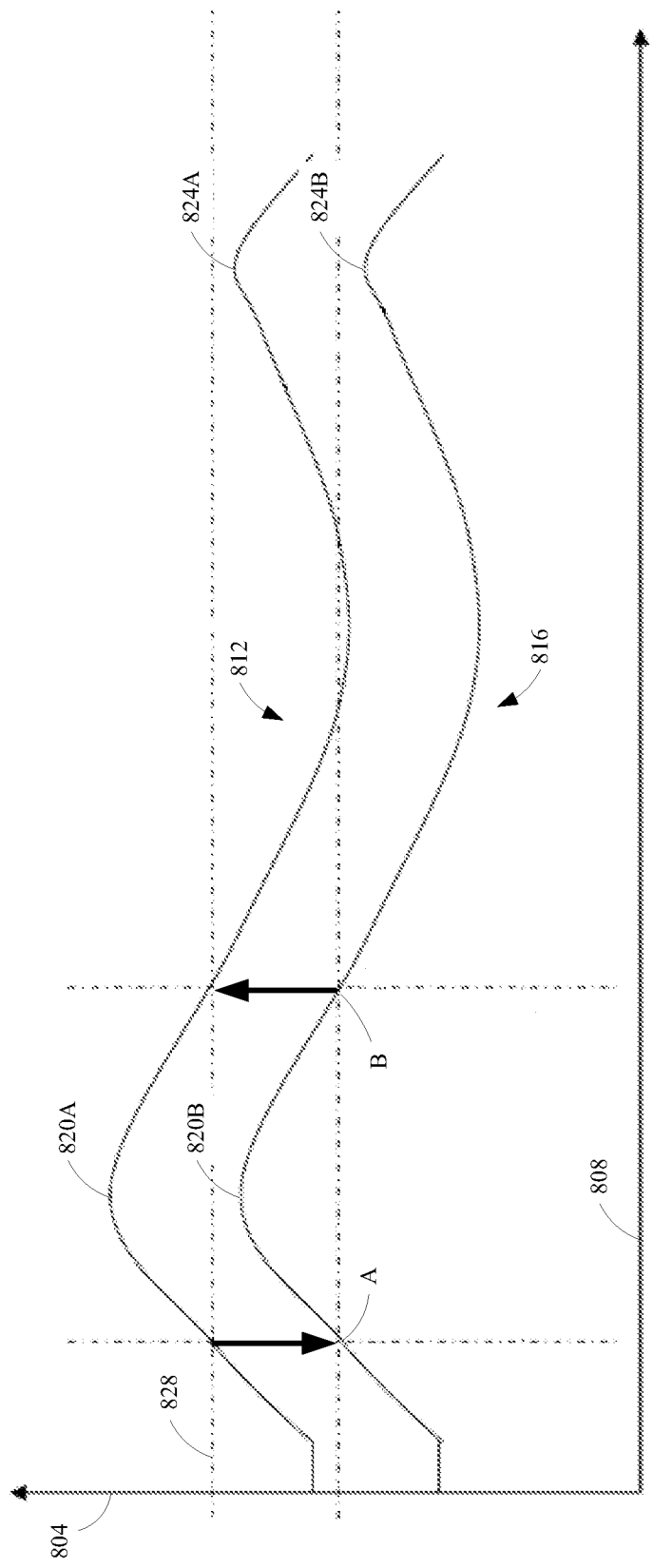
FIG. 18 is a plot of the operational current of the pipe cutter versus time.

In addition to the control process 450 described above, the pipe cutter 110 includes additional controls which enhance the operation of the pipe cutter 110. For example, FIG. 18 illustrates a plot 800 of tool current versus time as the pipe cutter 110 cuts through a pipe, such as a PVC pipe. The magnitude of the tool current is plotted along a y-axis 804, and time is plotted along an x-axis 808. Two curves are illustrated in the plot. The first curve 812 represents the current drawn by the tool when the output of a PWM is set at a first output level, such as 100% duty cycle (i.e., full motor speed). The second curve 816 represents the current drawn by the tool when the PWM is operating at a second output level such as, for example, a 50% duty cycle. Each of the first and second curves 812 and 816 includes a first peak current value 820A and 820B, respectively, and a second peak value 824A and 824B, respectively.

When the knife of the pipe cutter 110 is brought into contact with a pipe, the current drawn by the pipe cutter 110 increases to the first peak current value 820A until the pipe cutter 110 splits the pipe. After the pipe cutter 110 splits the pipe, the current draw of the pipe cutter 110 decreases until the knife reaches the opposing side of the pipe. The current drawn by the pipe cutter increases again to the second peak current value 82 until the knife completes cutting through the pipe and the current again diminishes. The current levels required at the first peak current level allow the pipe cutter 110 to generate a substantial amount of torque. The torque generated when initially brought in contact with a pipe is, in some instances, sufficient to break gear teeth in the drive mechanism. As such, a current threshold level 828 is established that, when exceeded, causes the controller 400 to reduce the duty cycle from the high or full-speed mode (i.e., 100% duty cycle) to a reduced duty cycle mode (e.g., 50% duty cycle) using pulse width modulation to reduce the loading on the pipe cutter 110 and, therefore, reduce the torque generated by the pipe cutter 110. The operational current of the pipe cutter 110 exceeding the current threshold level is considered an 'event' associated with a condition of the pipe cutter 110. The controller 400 is capable of detecting other events, such as a voltage threshold being exceeded, a timer threshold being exceeded, a temperature threshold, being exceeded, a speed threshold being exceeded, a torque threshold being exceeded, and the like.

A transition from the first duty cycle to the reduced duty cycle occurs at point A. After the pipe cutter 110 has initially split one side of the pipe, the duty cycle is increased at point B back to the original 100% duty cycle. The reduction in the duty cycle prevents the pipe cutter 110 from generating a torque that is able to, for example, break gear teeth. The PWM also causes a cyclical drive vibration in the knife of the pipe cutter 110. The vibration in the knife increases the pipe cutter's ability to cut through the pipe while operating at a lower speed and lower torque. The duty cycle control of the pipe cutter 110 is described in greater detail below with respect to FIGS. 19-20.

Figure 19:
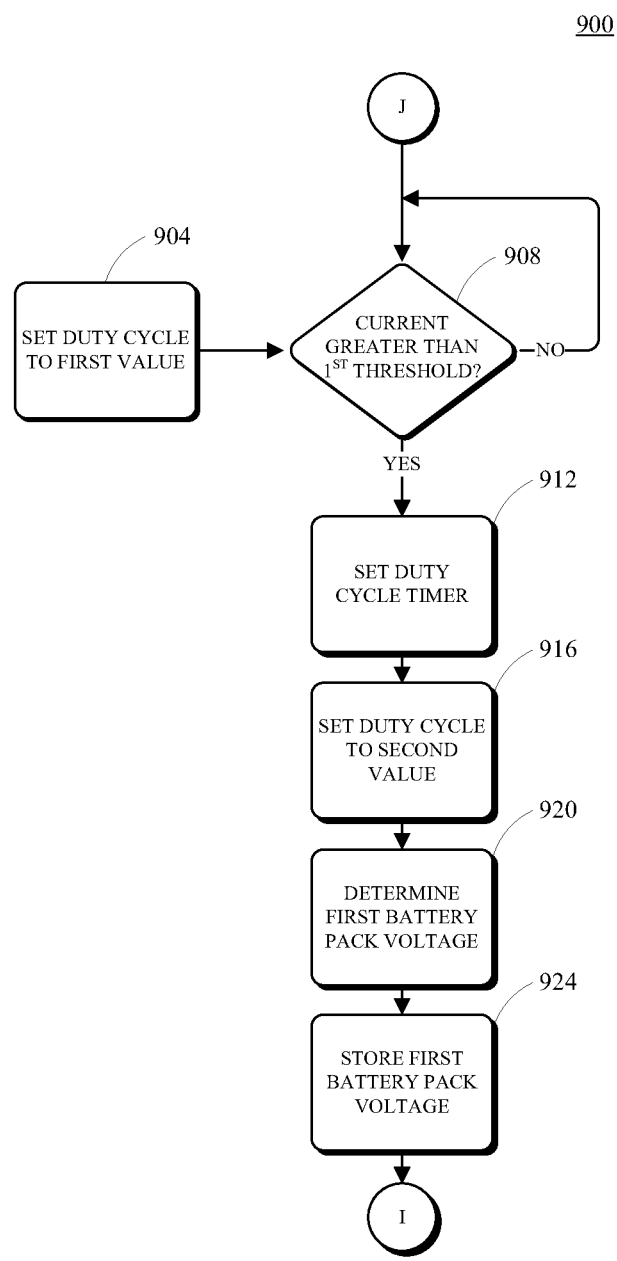
FIGS. 19-20 illustrate a process for controlling a duty cycle value for the pipe cutter.
Figure 20:
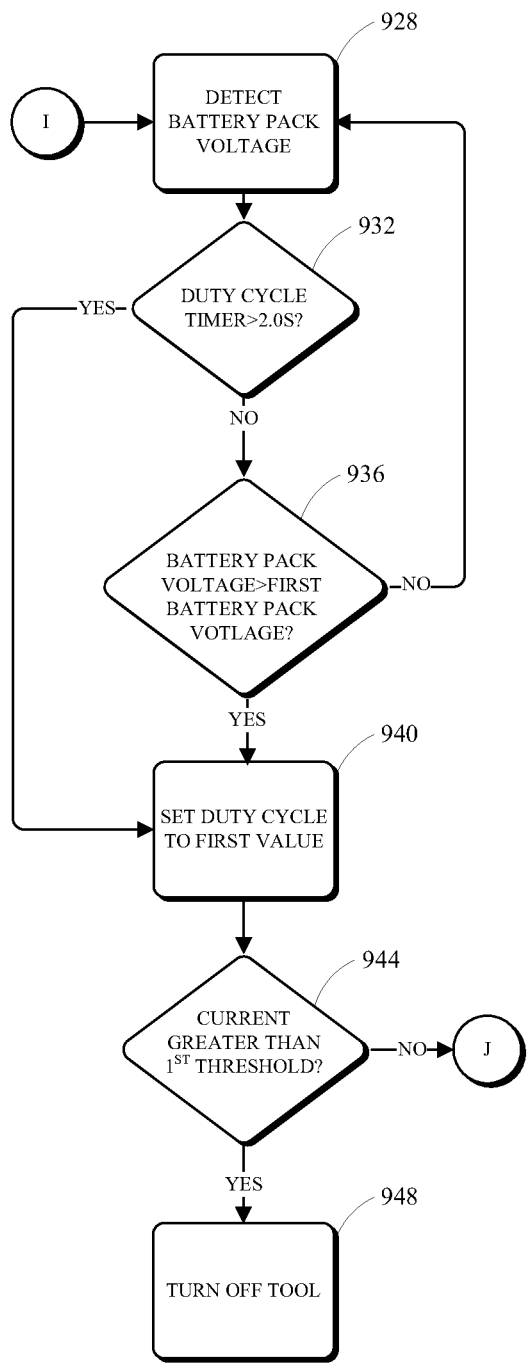
Figure 21:
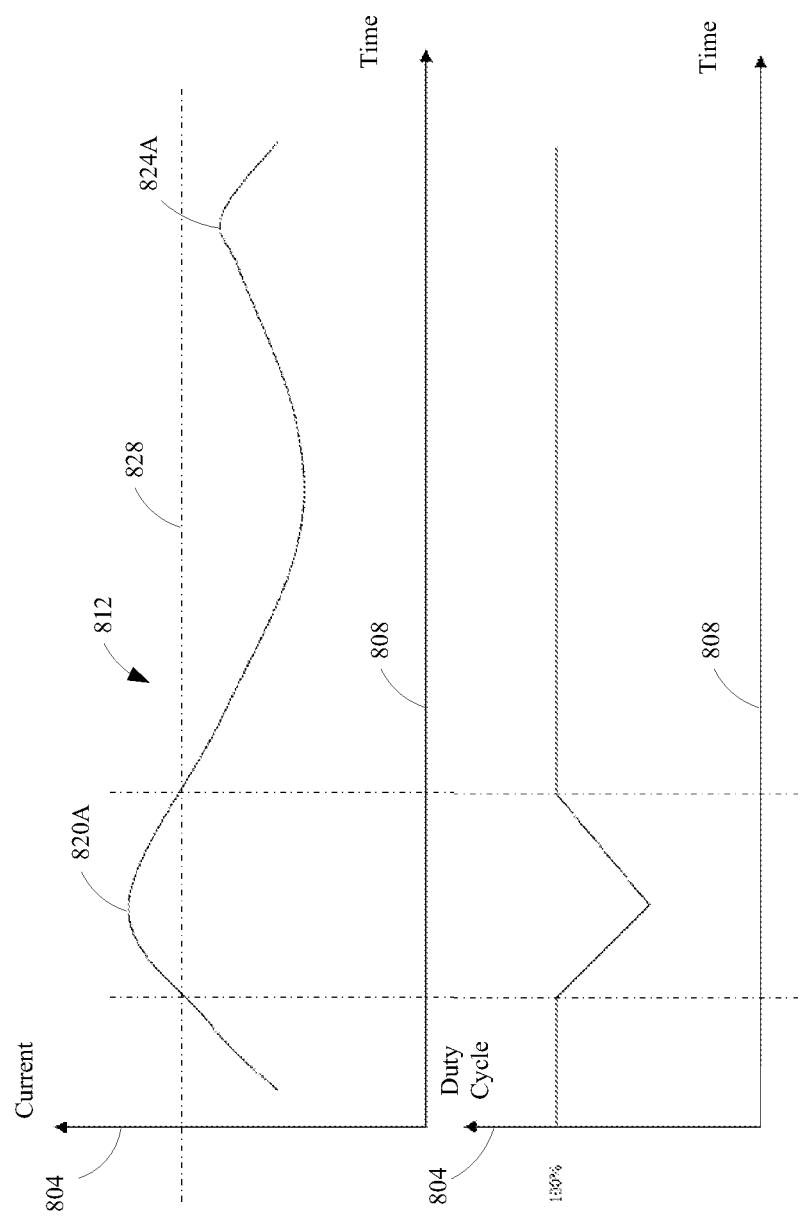
FIG. 21 is a plot of the operational current of the pipe cutter and the duty cycle of the pipe cutter versus time according to an embodiment of the invention.
Figure 22:
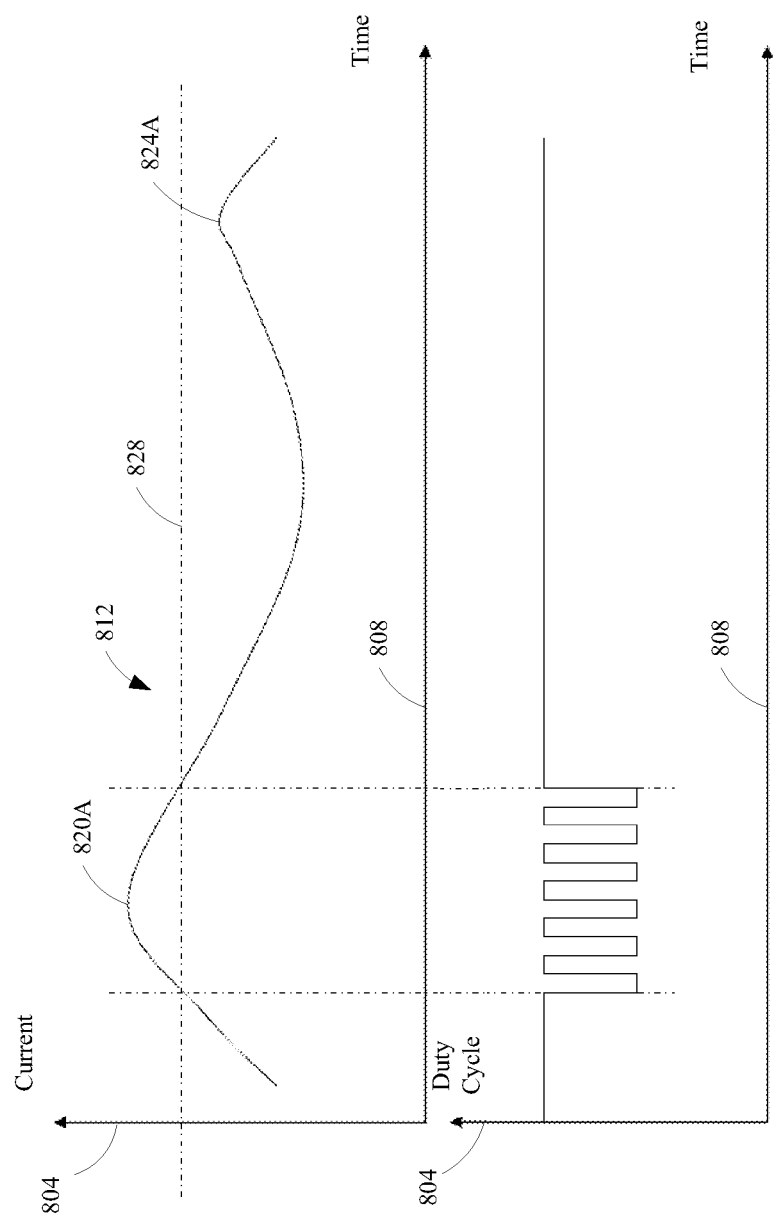
FIG. 22 is a plot of the operational current of the pipe cutter and the duty cycle of the pipe cutter versus time according to an embodiment of the invention.

FIGS. 19 and 20 illustrate a process 900 for controlling the duty cycle of the pipe cutter PWM that, in turn, controls the motor speed of the pipe cutter 110 and the torque generated by the pipe cutter 110. A first duty cycle value is set at step 904. The first duty cycle value is, in many instances a predetermined and preprogrammed value that is set by a manufacturer of the pipe cutter 110. However, in some embodiments, the first duty cycle value is set by a user of the pipe cutter 110 using, for example, a rotary dial which adjusts the wiper arm of a potentiometer, or up-down buttons. An operational current of the pipe cutter 110 is then compared to a first current threshold value (step 908). The first current threshold value is, in some embodiments, a current value corresponding to the safe operation of the pipe cutter 110 (e.g., a current level that does not generate sufficient torque to break gear teach). If the operational current of the pipe cutter 110 is not greater than the first current threshold value, the controller 400 continues to evaluate the operational current of the pipe cutter 110 with respect to the first current threshold value. If the operational current of the pipe cutter 110 exceeds the first current threshold value, a duty cycle timer is set (step 912), and the duty cycle of the PWM is set to a second value (step 916). The value of the second duty cycle is, in some embodiments, predetermined and preprogrammed by a manufacturer of the pipe cutter 110. In other embodiments, the second duty cycle is set by a user of the pipe cutter by adjusting, for example, a potentiometer.

A first voltage, $V_A$, of the battery pack is determined (step 920) when the controller 400 switches the operation of the pipe cutter 110 from the first duty cycle to the second duty cycle. The voltage level of the battery pack determined in step 920 is then stored in a memory of the pipe cutter 110, such as the EEPROM or RAM (step 924). With reference now to FIG. 20, the controller 400 detects the battery pack voltage (step 928) during operation of the pipe cutter 110 at the reduced duty cycle. Following the detection of the battery pack voltage, the controller 400 evaluates the duty cycle timer with respect a duty cycle timer threshold value (step 932). In the illustrated embodiment, the duty cycle timer threshold value is 2.0 s, although the threshold takes on different values in other embodiments of the invention. If the duty cycle timer is less than the duty cycle timer threshold value, the battery pack voltage detected at step 928 is compared to the battery pack voltage, $V_A$ (step 936). If the battery pack voltage detected at step 928 is less than the battery pack voltage, $V_A$, the battery pack voltage is detected again at step 928, and the duty cycle timer is again compared to the duty cycle timer threshold value (step 932). If the duty cycle timer is greater than the duty cycle timer threshold value, the pipe cutter 110 returns to operation at the first duty cycle value (e.g., 100%) (step 940). In a similar manner, if the battery pack voltage detected at step 928 is greater than the battery pack voltage, $V_A$, at step 936, the pipe cutter 110 returns to operation at the first duty cycle value (step 940). Following step 940, the operational current of the pipe cutter 110 is again compared to the first current threshold value (step 944). If the operational current of the pipe cutter 110 is determined to remain above the first current threshold value, the pipe cutter 110 is turned off (step 948) in a manner similar to that described above with respect to FIGS. 11-17. If the operational current of the pipe cutter 110 is below the first current threshold value, the pipe cutter 110 remains operational at the first duty cycle value, and continues to monitor operational current with respect to the first current threshold (step 908) (FIG. 19). In some embodiments, the duty cycle of the PWM returns to the first duty cycle level when the operational current of the pipe cutter 110 falls below the first current threshold value.

In other embodiments of the invention, the duty cycle of the PWM is controlled in alternative manners to that described above with respect to FIGS. 18-20. For example and with reference to FIG. 21, the operational current of the pipe cutter 110 is plotted with respect to time, as previously described with respect to FIG. 18. However, in contrast to the embodiment of the invention in which the duty cycle of the PWM is held constant at a reduced duty cycle, the embodiment of the invention illustrated in FIG. 21 reduces the duty cycle of the PWM in a linear or variable manner. For example, the duty cycle is reduced in a linear manner until a second duty cycle value is reached. The duty cycle of the PWM is then increased in a linear or variable manner until the duty cycle has once again reached the first duty cycle value (e.g., 100%). In other embodiments, the duty cycle of the PWM is reduced for a first predetermined or user adjustable period of time. When the period of time has lapsed, the duty cycle of the PWM is increased for a second predetermined time, which may be the same as the first predetermined period of time. In yet another embodiment, the duty cycle of the PWM is decreased a rate which is dependent on the rate at which the operational current of the pipe cutter 110 is increasing. With respect to the embodiment illustrated in FIG. 21, the process 900 described above with respect to FIGS. 19 and 20 may be used without substantial modification.

As yet another illustrative example, the duty cycle of the PWM is pulsed between the first duty cycle level (e.g., 100%) and a second duty cycle level (e.g., 50%). The operational current of the pipe cutter 110 is again plotted with respect to time, as previously described with respect to FIG. 18. When the operational current of the pipe cutter 110 exceeds the first current threshold value, the duty cycle is reduced to the second duty cycle value. However, in the embodiment illustrated in FIG. 22, the duty cycle remains at the second duty cycle level for only a predetermined period of time before the duty cycle is increased to the first duty cycle value. This pulsing of the duty cycle continues until, for example, the conditions described with respect to the process 900 of FIGS. 19 and 20 for returning to the first duty cycle value are satisfied, or when the operational current of the pipe cutter 110 falls below the first current threshold value. Additionally, the process 900 described above with respect to FIGS. 19 and 20 may be used without substantial modification to implement the embodiment of the invention illustrated in FIG. 22.

Thus, the invention provides, among other things, a controller for controlling the operation of a battery-powered pipe cutter. The controller executes a control process that includes a plurality of safety tests and evaluations that are used to determine whether the pipe cutter is operating within acceptable operational parameters. The controller also executes a process for reducing the duty cycle of a pulse width modulator to control the output current and torque of the pipe cutter at levels that prevent the pipe cutter from, for example, breaking gear teeth. Various features and advantages of the invention are set forth in the following claims.

What is claimed is:

1. A power tool comprising:
   a pipe holder;
   a knife pivotally coupled to the pipe holder;
   a drive mechanism coupled to at least one of the pipe holder and the knife, the drive mechanism operable to move the at least one of the pipe holder and the knife relative to the other of the pipe holder and the knife;
   a motor coupled to the drive mechanism;
   a battery pack electrically coupled to the motor, the motor receiving a power signal with a duty cycle having a first value; and
   a controller configured to
      monitor a first parameter associated with the power tool,
      detect at least one event associated with the first parameter associated with the power tool,
      wherein the power signal duty cycle is modified from the first value to a second, non-zero value when the controller detects the at least one event associated with the first parameter,
      wherein the power signal duty cycle is modified from the second, non-zero value to the first value based on a second parameter associated with the power tool, the second parameter associated with the power tool being different than the first parameter associated with the power tool, the second parameter associated with the power tool being a voltage of the battery pack, and
      wherein the power signal duty cycle is modified from the second, non-zero value to the first value when the voltage of the battery pack is greater than a first voltage of the battery pack, the first voltage of the battery pack corresponding to the voltage of the battery pack when the power signal duty cycle was modified from the first value to the second value.

2. The power tool of claim 1, wherein the battery pack is a Lithium-ion based battery pack.

3. The power tool of claim 1, wherein the battery pack is a power tool battery pack usable with the power tool and another power tool.

4. The power tool of claim 1, wherein the first value of the duty cycle is one-hundred percent.

5. The power tool of claim 1, wherein the second value of the duty cycle is less than the first value of the duty cycle.

6. The power tool of claim 1, wherein the first parameter associated with the power tool is an operational current of the power tool.

7. The power tool of claim 6, wherein the at least one event associated with the power tool is the operational current of the power tool exceeding a first threshold value.

8. The power tool of claim 1, wherein the drive mechanism includes a gear assembly coupled to the at least one of the pipe holder and the knife to move the at least one of the pipe holder and the knife relative to the other of the pipe holder and the knife.

9. The power tool of claim 1, further comprising a spring positioned between the pipe holder and the knife to bias the knife away from the pipe holder.

10. The power tool of claim 1, wherein the pipe holder and the knife define a slot configured to receive a pipe, wherein the drive mechanism includes a spring coupled to the pipe holder, and wherein a portion of the spring is operable to engage a portion of the at least one of the pipe holder and the knife to adjust the size of the slot.

11. The power tool of claim 1, wherein the power signal duty cycle is modified from the second, non-zero value to the first value when a timer is greater than a threshold value.

12. A method for operating a power tool driven by a battery pack, the method comprising:
   selectively providing a power signal having a power signal duty cycle to a motor for driving a drive mechanism;
   supporting a pipe in a pipe holder;
   operating the drive mechanism to move a knife relative to the pipe holder to cut the pipe;
   monitoring a first parameter associated with the power tool;
   detecting at least one event associated with the first parameter associated with the power tool; and
   modifying the power signal duty cycle from a first value to a second, non-zero value when the at least one event associated with the first parameter associated with the power tool is detected, and modifying the power signal duty cycle from the second, non-zero value to the first value based on a second parameter associated with the power tool, the second parameter associated with the power tool being different than the first parameter associated with the power tool, wherein modifying the power signal duty cycle from the second, non-zero value to the first value includes modifying the power signal duty cycle from the second, non-zero value to the first value when a voltage of the battery pack is greater than a first voltage of the battery pack, the first voltage of the battery pack corresponding to the voltage of the battery pack when the power signal duty cycle was modified from the first value to the second, non-zero value.

13. The method of claim 12, further comprising coupling a battery pack to the power tool.

14. The method of claim 13, wherein the battery pack is a Lithium-ion based battery pack.

15. The method of claim 13, wherein the battery pack is a power tool battery pack usable with the power tool and another power tool.

16. The method of claim 12, wherein the first value of the duty cycle is one-hundred percent.

17. The method of claim 12, wherein the second value of the duty cycle is less than the first value of the duty cycle.

18. The method of claim 12, wherein the first parameter associated with the power tool is an operational current of the power tool.

19. The method of claim 12, wherein the at least one event associated with the power tool is an operational current of the power tool exceeding a first threshold value.

* * * * *